(12) United States Patent
Lahiri et al.

(10) Patent No.: US 9,362,553 B2
(45) Date of Patent: Jun. 7, 2016

(54) MICROSTRUCTURED ELECTRODE STRUCTURES

(71) Applicant: ENOVIX CORPORATION, Fremont, CA (US)

(72) Inventors: Ashok Lahiri, Cupertino, CA (US); Robert M. Spotnitz, Pleasanton, CA (US); Nirav S. Shah, Pleasanton, CA (US); Murali Ramasubramanian, Fremont, CA (US); Harrold J. Rust, III, Alamo, CA (US); James D. Wilcox, Pleasanton, CA (US); Michael J. Armstrong, Danville, CA (US); Brian E. Brusca, Tracy, CA (US); Christopher G. Castledine, Sunnyvale, CA (US); Laurie J. Lauchlan, Saratoga, CA (US)

(73) Assignee: ENOVIX CORPORATION, Fremont, CA (US)

( * ) Notice: Subject to any disclaimer, the term of this patent is extended or adjusted under 35 U.S.C. 154(b) by 88 days.

(21) Appl. No.: 14/334,901

(22) Filed: Jul. 18, 2014

(65) Prior Publication Data
US 2014/0329132 A1 Nov. 6, 2014

Related U.S. Application Data

(63) Continuation of application No. 13/357,320, filed on Jan. 24, 2012, now Pat. No. 8,841,030.

(51) Int. Cl.
*H01M 4/13* (2010.01)
*H01M 4/134* (2010.01)
(Continued)

(52) U.S. Cl.
CPC ............... *H01M 4/134* (2013.01); *H01G 4/008* (2013.01); *H01G 4/012* (2013.01); *H01G 4/015* (2013.01); *H01G 4/32* (2013.01); *H01M 4/1395* (2013.01);
(Continued)

(58) Field of Classification Search
CPC ............ H01M 4/70; H01M 4/72; H01M 4/78
See application file for complete search history.

(56) References Cited

U.S. PATENT DOCUMENTS

| 5,294,504 A | 3/1994 | Otagawa et al. |
| 6,090,505 A | 7/2000 | Shimamura et al. |

(Continued)

FOREIGN PATENT DOCUMENTS

| CA | 02388711 A1 | 5/2001 |
| CN | 1555588 | 12/2004 |

(Continued)

OTHER PUBLICATIONS

Green et al., Structured silicon anodes for lithium battery applications, Electrochemical and Solid State Letters, 6, 2003, A75-A79.
(Continued)

*Primary Examiner* — Scott J Chmielecki
(74) *Attorney, Agent, or Firm* — Bryan Cave LLP

(57) ABSTRACT

A structure for use in an energy storage device, the structure comprising a backbone system extending generally perpendicularly from a reference plane, and a population of microstructured anodically active material layers supported by the lateral surfaces of the backbones, each of the microstructured anodically active material layers having a void volume fraction of at least 0.1 and a thickness of at least 1 micrometer.

20 Claims, 11 Drawing Sheets

(51) Int. Cl.

| | | |
|---|---|---|
| *H01M 10/052* | (2010.01) | |
| *H01M 4/1395* | (2010.01) | |
| *H01M 4/38* | (2006.01) | |
| *H01G 4/32* | (2006.01) | |
| *H01G 4/008* | (2006.01) | |
| *H01G 4/012* | (2006.01) | |
| *H01G 4/015* | (2006.01) | |
| *H01M 4/80* | (2006.01) | |
| *H01M 10/04* | (2006.01) | |
| *H01M 10/0525* | (2010.01) | |
| *H01M 10/054* | (2010.01) | |
| *H01M 10/0564* | (2010.01) | |
| *H01M 4/70* | (2006.01) | |
| *H01M 4/02* | (2006.01) | |
| *B82Y 30/00* | (2011.01) | |

(52) U.S. Cl.
CPC ............... *H01M 4/386* (2013.01); *H01M 4/70* (2013.01); *H01M 4/80* (2013.01); *H01M 10/0436* (2013.01); *H01M 10/052* (2013.01); *H01M 10/054* (2013.01); *H01M 10/0525* (2013.01); *H01M 10/0564* (2013.01); *B82Y 30/00* (2013.01); *H01M 2004/021* (2013.01); *H01M 2220/30* (2013.01); *H01M 2300/0017* (2013.01); *Y02E 60/122* (2013.01)

(56) References Cited

U.S. PATENT DOCUMENTS

| | | | |
|---|---|---|---|
| 6,235,427 | B1 | 5/2001 | Idota et al. |
| 6,287,371 | B1 | 9/2001 | Ota et al. |
| 6,432,585 | B1 | 8/2002 | Kawakami et al. |
| 7,402,829 | B2 | 7/2008 | Green |
| 8,101,298 | B2 | 1/2012 | Green et al. |
| 2002/0013986 | A1 | 2/2002 | Ahn et al. |
| 2004/0234861 | A1 | 11/2004 | Kawase et al. |
| 2004/0241540 | A1 | 12/2004 | Tsutsumi et al. |
| 2005/0208379 | A1 | 9/2005 | Musha et al. |
| 2007/0172732 | A1 | 7/2007 | Jung et al. |
| 2009/0035664 | A1 | 2/2009 | Chiang et al. |
| 2009/0068567 | A1 | 3/2009 | Konishiike et al. |
| 2009/0123847 | A1* | 5/2009 | Okada .................. H01M 4/5825 429/319 |
| 2009/0263716 | A1 | 10/2009 | Ramasubramanian et al. |
| 2010/0040951 | A1* | 2/2010 | Yamamoto ............ H01M 4/134 429/231.95 |
| 2010/0051856 | A1* | 3/2010 | Kim ...................... H01M 4/131 252/182.1 |
| 2010/0266907 | A1 | 10/2010 | Yazami |
| 2010/0285368 | A1 | 11/2010 | Yamamoto et al. |
| 2011/0020713 | A1* | 1/2011 | Cui ...................... H01M 4/0421 429/342 |
| 2011/0020719 | A1 | 1/2011 | Manabe et al. |
| 2011/0067228 | A1 | 3/2011 | Green |
| 2011/0129732 | A1* | 6/2011 | Bachrach ............. H01M 4/134 429/220 |
| 2011/0171518 | A1 | 7/2011 | Dunn et al. |

FOREIGN PATENT DOCUMENTS

| | | |
|---|---|---|
| EP | 0883199 A1 | 12/1998 |
| NL | 1015956 C2 | 2/2002 |
| WO | 2008/089110 A1 | 7/2008 |
| WO | 2009/129490 A1 | 10/2009 |
| WO | 2009/140300 A1 | 11/2009 |

OTHER PUBLICATIONS

Liu, Chang, Foundations of MEMS, Prentice Hall Inc. Chapter 10, pp. 1-55.
Long et al., Three Dimensional Battery Architectures, Chemical Reviews, 2004, 104, 4463-4492.
Obrovac, M. N. et al., Reversible Cycling of Crystalline Silicon Powder, Journal of the Electrochemical Society, 2007, A103-A108, 154(2).
Shin et al., Porous Silicon Negative Electrodes for Rechargeable Lithium Batteries, Journal of Power Sources, 139 (2005) 314-320.
Vyatkin et al., Random and Ordered Macropore in p-type silicon J. Electrochem. Soc. 149, 1, G70-G76 (2002).
Waidmann, S. et al., Tuning nickel silicide properties using a lamp based RTA, a heat conduction based RTA or a furnace anneal, Microelectronic Engineering 83, 2006, 2282-2286.
Xu, Chengkun et al., Nickel Displacement Deposition of Porous Silicon with Ultrahigh Aspect Ratio, Journal of the Electrochemical Society, 2007,170-174,154(3).
Arora, P. et al., Battery Separators, Chemical Reviews 2004, 104, 4419-4462.
Bourderau et al., Amorphous Silicon as a Possible Anode Material for Li-Ion Batteries, Journal of Power Sources, 1999, 81-82, 233-236.
Li et al., The Crystal Structural Evolution of Nano-Si Anode Caused by Lithium Insertion and Extraction at Room Temperature, Solid State Ionics, 2000, 135, 181-191.
Kasavajjula et al., Nano- and Bulk-Silicon-Based Insertion Anodes for Lithium-Ion Secondary Cells, Journal of Power Sources, 2007, 163, 1003-1039.
Mu et al., Silicon nanotube array/gold electrode for direct electrochemistry of cytochrome C, J. Phys. Chem. B, 2007, 111(6), 1491-1495.
European Patent Office, Extended Search Report for EP 13 74 0825, App. No. 13740825.8, issued Aug. 8, 2015, 9 pages.

\* cited by examiner

MICROSTRUCTURED ELECTRODE STRUCTURES

FIELD OF THE INVENTION

The present invention generally relates to structures for use in energy storage devices, to energy storage devices incorporating such structures, and to methods for producing such structures and energy devices.

BACKGROUND OF THE INVENTION

Rocking chair or insertion secondary batteries are a type of energy storage device in which carrier ions, such as lithium, sodium or potassium ions, move between an anode electrode and a cathode electrode through an electrolyte. The secondary battery may comprise a single battery cell, or two more battery cells that have been electrically coupled to form the battery, with each battery cell comprising an anode electrode, a cathode electrode, and an electrolyte.

In rocking chair battery cells, both the anode and cathode comprise materials into which a carrier ion inserts and extracts. As a cell is discharged, carrier ions are extracted from the anode and inserted into the cathode. As a cell is charged, the reverse process occurs: the carrier ion is extracted from the cathode and inserted into the anode.

FIG. 1 shows a cross sectional view of an electrochemical stack of an existing energy storage device, such as a non-aqueous, lithium-ion battery. The electrochemical stack 1 includes a cathode current collector 2, on top of which a cathode layer 3 is assembled. This layer is covered by a microporous separator 4, over which an assembly of an anode current collector 5 and an anode layer 6 are placed. This stack is sometimes covered with another separator layer (not shown) above the anode current collector 5, rolled and stuffed into a can, and filled with a non-aqueous electrolyte to assemble a secondary battery.

The anode and cathode current collectors pool electric current from the respective active electrochemical electrodes and enables transfer of the current to the environment outside the battery. A portion of an anode current collector is in physical contact with the anode active material while a portion of a cathode current collector is in contact with the cathode active material. The current collectors do not participate in the electrochemical reaction and are therefore restricted to materials that are electrochemically stable in the respective electrochemical potential ranges for the anode and cathode.

In order for a current collector to bring current to the environment outside the battery, it is typically connected to a tab, a tag, a package feed-through or a housing feed-through, typically collectively referred to as contacts. One end of a contact is connected to one or more current collectors while the other end passes through the battery packaging for electrical connection to the environment outside the battery. The anode contact is connected to the anode current collectors and the cathode contact is connected to the cathode current collectors by welding, crimping, or ultrasonic bonding or is glued in place with an electrically conductive glue.

During a charging process, lithium leaves the cathode layer 3 and travels through the separator 4 as a lithium ion into the anode layer 6. Depending upon the anode material used, the lithium ion either intercalates (e.g., sits in a matrix of an anode material without forming an alloy) or forms an alloy. During a discharge process, the lithium leaves the anode layer 6, travels through the separator 4 and passes through to the cathode layer 3. The current conductors conduct electrons from the battery contacts (not shown) to the electrodes or vice versa.

Existing energy storage devices, such as batteries, fuel cells, and electrochemical capacitors, typically have two-dimensional laminar architectures (e.g., planar or spiral-wound laminates) as illustrated in FIG. 1 with a surface area of each laminate being roughly equal to its geometrical footprint (ignoring porosity and surface roughness).

Three-dimensional batteries have been proposed in the literature as ways to improve battery capacity and active material utilization. It has been proposed that a three-dimensional architecture may be used to provide higher surface area and higher energy as compared to a two dimensional, laminar battery architecture. There is a benefit to making a three-dimensional energy storage device due to the increased amount of energy that may be obtained out of a small geometric area. See, e.g., Rust et al., WO2008/089110 and Long et. al, "Three-Dimensional Battery Architectures," *Chemical Reviews*, (2004), 104, 4463-4492.

New anode and cathode materials have also been proposed as ways to improve the energy density, safety, charge/discharge rate, and cycle life of secondary batteries. Some of these new high capacity materials, such as silicon, aluminum, or tin anodes in lithium batteries have significant volume expansion that causes disintegration and exfoliation from its existing electronic current collector during lithium insertion and extraction. Silicon anodes, for example, have been proposed for use as a replacement for carbonaceous electrodes since silicon anodes have the capacity to provide significantly greater energy per unit volume of host material for lithium in lithium battery applications. See, e.g., Konishiike et al., U.S. Patent Publication No. 2009/0068567; Kasavajjula et al., "Nano- and Bulk-Silicon-Based Insertion Anodes for Lithium-Ion Secondary Cells," *Journal of Power Sources* 163 (2007) 1003-1039. The formation of lithium silicides when lithium is inserted into the anode results in a significant volume change which can lead to crack formation and pulverisation of the anode. As a result, capacity of the battery can be decreased as the battery is repeatedly discharged and charged.

Various strategies have been proposed to overcome the challenges presented by the significant volume changes experienced by silicon anodes as a result of repeated charge and discharge cycles. For example, Bourderau et al. discloses amorphous silicon (Bourderau et al., "Amorphous Silicon As A Possible Anode Material For Li-Ion Batteries," *Journal of Power Sources* 81-82 (1999) 233-236)). Li et al. discloses silicon nanowires (Li et al., "The Crystal Structural Evolution Of Nano-Si Anode Caused By Lithium Insertion And Extraction At Room Temperature," *Solid State Ionics* 135 (2000) 181-191. In NL1015956, Sloe Yao Kan discloses a porous silicon electrode for a battery. Shin et al. also disclose porous silicon electrodes for batteries (Shin et al., "Porous Silicon Negative Electrodes For Rechargeable Lithium Batteries," *Journal of Power Sources* 139 (2005) 314-320.

Monolithic electrodes, i.e., electrodes comprising a mass of electrode material that retains its a shape without the use of a binder, have also been proposed as an alternative to improve performance (gravimetric and volumetric energy density, rates, etc) over particulate electrodes that have been molded or otherwise formed into a shape and depend upon a conductive agent or binder to retain the shape of an agglomerate of the particulate material. A monolithic anode, for example, may comprise a unitary mass of silicon (e.g., single crystal silicon, polycrystalline silicon, or amorphous silicon) or it may comprise an agglomerated particulate mass that has been sintered or otherwise treated to fuse the anodic material together and remove any binder. In one such exemplary embodiment, a silicon wafer may be employed as a monolithic anode material for a lithium-ion battery with one side of the wafer coupled to a first cathode element through a separator, while the other side is coupled to a second cathode element opposing it. In such arrangements, one of the significant technical challenges is the ability to collect and carry current from the monolithic electrode to the outside of the battery while efficiently utilizing the space available inside the battery.

The energy density of conventional batteries may also be increased by reducing inactive component weights and volumes to pack the battery more efficiently. Current batteries use relatively thick current collectors since the foils that make up the current collectors are used with a minimum thickness requirement in order to be strong enough to survive the active material application process. Advantages in performance can be anticipated if an invention was made in order to separate the current collection from processing constraints.

Despite the varied approaches, a need remains for improved battery capacity and active material utilization.

SUMMARY OF THE INVENTION

Among the various aspects of the present invention is the provision of three-dimensional structures for use in energy storage devices such as batteries, fuel cells, and electrochemical capacitors. Such three dimensional structures comprise a layer of microstructured anodically active material on a lateral surface of a backbone structure, the layer containing a void fraction that accommodates significant volume changes in the anodically active material as it cycles between a charged and a discharged state. Advantageously, such three-dimensional structures may be incorporated into two or more battery cells that have been stacked vertically whereby, the shortest distance between the anodically active material and the cathode material in a battery cell is measured in a direction that is orthogonal to the direction of stacking of the battery cells (e.g., in X-Y-Z coordinates, if the direction of stacking is in the Z-direction, the shortest distance between the anodically active material and the cathode material is measured in the X- or Y-direction). Such three-dimensional energy storage devices may produce higher energy storage and retrieval per unit geometrical area than conventional devices. They may also provide a higher rate of energy retrieval than two-dimensional energy storage devices for a specific amount of energy stored, such as by minimizing or reducing transport distances for electron and ion transfer between an anode and a cathode. These devices may be more suitable for miniaturization and for applications where a geometrical area available for a device is limited and/or where energy density requirement is higher than what may be achieved with a laminar device.

Briefly, therefore, one aspect of the present invention is a structure for use in an energy storage device. The structure comprises a population of microstructured anodically active material layers, wherein (a) members of the population comprise a fibrous or porous anodically active material and have a surface that is substantially perpendicular to a reference plane, (ii) a thickness of at least 1 micrometer measured in a direction parallel to the reference plane, a height of at least 50 micrometers measured in a direction orthogonal to the reference plane, and a void volume fraction of at least 0.1. In addition, the lineal distance between at least two members of the population, measured in a direction parallel to the reference plane, is greater than the maximum height of any of the layers in the population.

Another aspect of the present invention is a structure for use in an energy storage device comprising a backbone network comprising a series of lateral surfaces. The lateral surfaces are substantially perpendicular to a reference plane and have a height of at least 50 micrometers measured in a direction that is substantially perpendicular to the reference plane. The structure further comprises a population of microstructured anodically active material layers supported by the lateral surfaces, the greatest lineal distance between at least two of the lateral surfaces in the population measured in a direction parallel to the reference plane being greater than the maximum height of any of the lateral surfaces in the series. The microstructured anodically active material layers comprise a front surface, a back surface, and a fibrous or porous anodically active material, the microstructured anodically active material layers having a void volume fraction of at least 0.1 and a thickness between the front and back surfaces of at least 1 micrometer. The back surface of each such microstructured anodically active material layer is proximate the lateral surface of the backbone supporting such microstructured anodically active material layer. The front surface of each such microstructured anodically active material layer is distal to the lateral surface of the backbone supporting such microstructured anodically active material layer. Fibers comprised by a member of the population of microstructured anodically active material layers are attached to and have central axes that are substantially parallel to the reference plane at the point of attachment of the fibers to the back surface of the population member comprising such fibers. Pores comprised by a member of the population of microstructured anodically active material layers have pore openings having major axes that are substantially parallel to the reference plane.

Another aspect of the present invention is an electrochemical stack for use in an energy storage device. The electrochemical stack comprises, in a stacked arrangement, cathode structures, separator layers and anode structures, the separator layers being disposed between the anode structures and the cathode structures, with the direction of stacking of the cathode structures, the separator layers, and the anode structures in the electrochemical stack being parallel to a reference plane. The anode structures comprise a population of microstructured anodically active material layers wherein (a) members of the population comprise a fibrous or porous anodically active material and have (i) a surface that is substantially perpendicular to the reference plane, (ii) a thickness of at least 1 micrometer measured in a direction parallel to the reference plane, (iii) a height of at least 50 micrometers measured in a direction orthogonal to the reference plane, and (iv) a void volume fraction of at least 0.1. Additionally, the lineal distance between at least two members of the population, measured in a direction parallel to the reference plane, is greater than the maximum height of a member of the population.

Another aspect of the present invention is an electrochemical stack for use in an energy storage device. The electrochemical stack comprises a population of anode structures, cathode structures, and separator layers comprising a porous dielectric material between the anode structures and the cathode structures. The anode structures, cathode structures and separator layers are stacked in a direction substantially parallel to a reference plane wherein each anode structure comprises (a) a backbone having a lateral surface, the lateral surface being substantially perpendicular to the reference plane and having a height of at least 50 micrometers measured in a direction that is substantially perpendicular to the surface of the reference plane, and (b) a microstructured anodically active material layer supported by the lateral surface. The lineal distance between at least two members of the population, measured in a direction parallel to the reference plane, is greater than the maximum height of a member of the population. The microstructured anodically active material layer comprises a back surface, a front surface, and a fibrous or porous anodically active material. The microstructured anodically active material layer further has a void volume fraction of at least 0.1 and a thickness between the back and front surfaces of at least 1 micrometer, wherein (i) the back surface of each such microstructured anodically active material layer is proximate the lateral surface of the backbone supporting such microstructured anodically active material layer, (ii) the front surface of each such microstructured anodically active material layer is distal to the lateral surface of the backbone supporting such microstructured anodically active material layer, (iii) fibers comprised by a member of the population of microstructured anodically active material layers are attached to and have central axes that are substantially perpendicular to the back surface of the member comprising such fibers and (iv) pores comprised by a member of the population of microstructured anodically active material layers have pore openings having major axes that are substantially parallel to the reference plane.

Another aspect of the present invention is an energy storage device comprising carrier ions, a non-aqueous electrolyte and an electrochemical stack, the carrier ions being lithium, sodium or potassium ions, the electrochemical stack comprising, in a stacked arrangement, cathode structures, separator layers and anode structures, the separator layers being disposed between the anode structures and the cathode structures. The direction of stacking of the cathode structures, separator layers, and anode structures in the electrochemical stack is parallel to a reference plane. The anode structures comprise a population of microstructured anodically active material layers wherein (a) members of the population comprise a fibrous or porous anodically active material and have (i) a surface that is substantially perpendicular to the reference plane, (ii) a thickness of at least 1 micrometer measured in a direction parallel to the reference plane, (iii) a height of at least 50 micrometers measured in a direction orthogonal to the reference plane, and (iv) a void volume fraction of at least 0.1. The lineal distance between at least two members of the population, measured in a direction parallel to the reference plane, is greater than the maximum height of any member of the population of microstructured anodically active material layers.

Another aspect of the present invention is a secondary battery comprising carrier ions, a non-aqueous electrolyte and at least two electrochemical stacks, the carrier ions being lithium, sodium or potassium ions. Each of the electrochemical stacks comprises, in a stacked arrangement, cathode structures, separator layers and anode structures. The separator layers are disposed between the anode structures and the cathode structures, and the direction of stacking of the cathode structures, the separator layers, and the anode structures within each such electrochemical stack is parallel to a reference plane. The anode structures comprise a population of microstructured anodically active material layers wherein (a) members of the population comprise a fibrous or porous anodically active material and have (i) a surface that is substantially perpendicular to the reference plane, (ii) a thickness of at least 1 micrometer measured in a direction parallel to the reference plane, (iii) a height of at least 50 micrometers measured in a direction orthogonal to the reference plane, and (iv) a void volume fraction of at least 0.1. Additionally, the electrochemical stacks are stacked relative to each other in a direction that is orthogonal to the reference plane.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Among the various aspects of the present invention may be noted three-dimensional structures offering particular advantages when incorporated into electrochemical stacks of energy storage devices such as batteries, capacitors, and fuel cells. For example, such structures may be incorporated into secondary batteries in which an anode, a cathode, and/or a separator are non-laminar in nature. Advantageously, the surface area for such non-laminar anode structures and cathode structures may exceed the geometrical footprint of a base supporting the electrodes by a factor of 1.5, a factor of 2, a factor of 2.5 or even a factor of 3 or more. In one preferred exemplary embodiment, such structures are incorporated into secondary batteries in which carrier ions selected from lithium, sodium and potassium ions move between the anode and the cathode.

Figure 2:
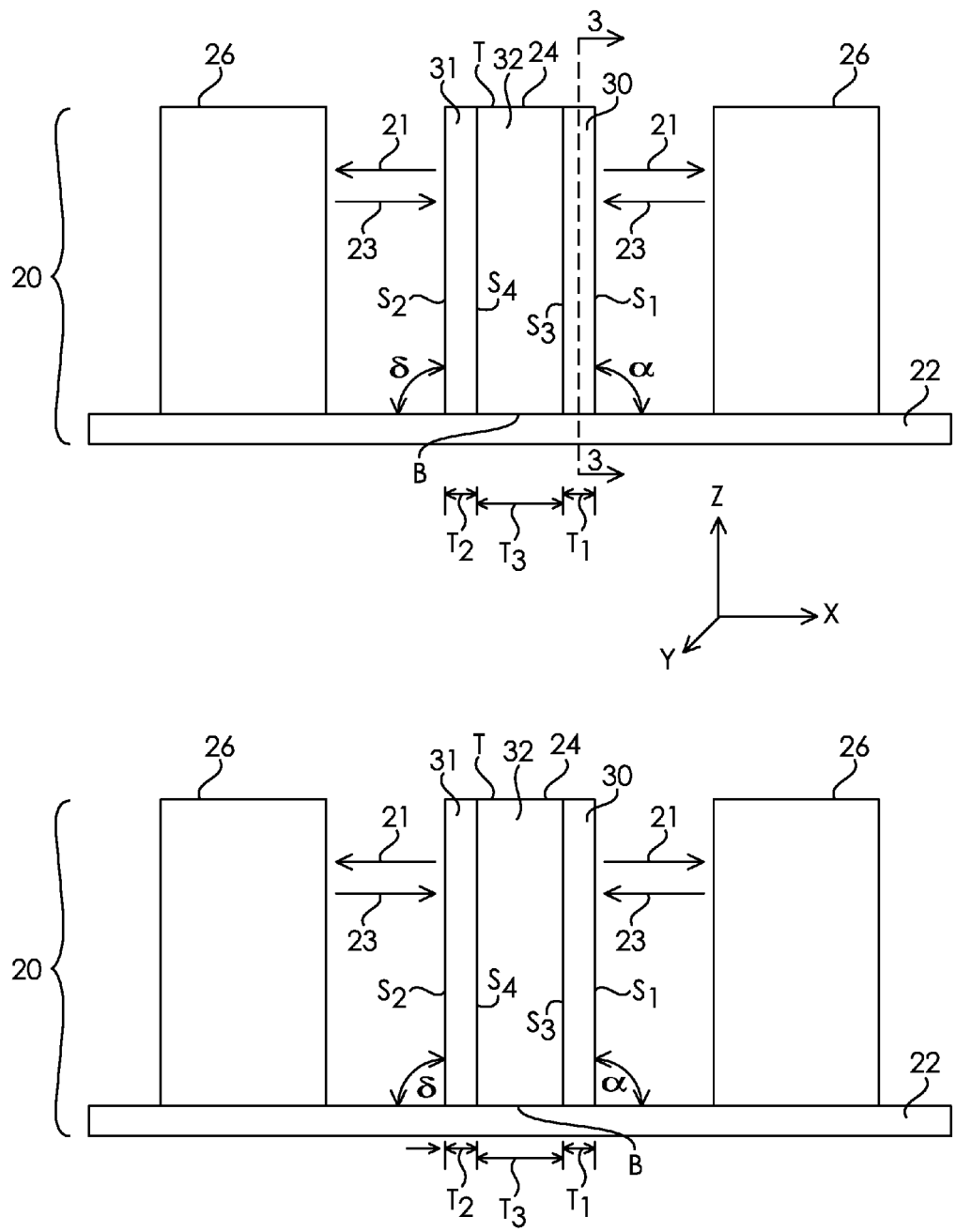
FIG. 2 is a schematic illustration of two cells of a three-dimensional energy storage device of the present invention such as a secondary battery.

FIG. 2 schematically depicts electrochemical stacks of two cells of a three-dimensional battery in accordance with one embodiment of the present invention. For ease of illustration, only one anode structure 24 and two cathode structures 26 are depicted in FIG. 2 for each cell 20 and only two cells appear in FIG. 2; in practice, however, the electrochemical stack of each cell will typically comprise a series of anode and cathode structures extending vertically from a common reference plane, with the number of anode and cathode structures per cell and the number of cells in the battery depending upon the application. For example, in one embodiment the number of anode structures in an electrochemical stack is at least 10. By way of further example in one embodiment the number of anode structures in an electrochemical stack is at least 50. By way of further example the number of anode structures in an electrochemical stack is at least 100.

The electrochemical stack of each cell 20, as depicted, comprises base 22, anode structure 24 and cathode structures 26. Each anode structure 24 projects vertically (i.e., in the Z-direction as illustrated by the axes in FIG. 2) from a common reference plane, the surface of base 22 (as illustrated) and has a bottom surface B proximate base 22, a top surface T distal to base 22 and lateral surfaces $S_1$, $S_2$ extending from top surface T to bottom surface B. Lateral surface $S_1$ intersects the surface of base 22 at angle α and lateral surface $S_2$ intersects the surface of base 22 at angle δ. In a preferred embodiment, α and δ are approximately equal and are between about 80° and 100°. For example, in one embodiment, α and δ are approximately equal and are 90°±5°. In a particularly preferred embodiment, α and δ are substantially the same and approximately 90°. Independent of the angle of intersection, it is generally preferred that the majority of the surface area of each of lateral surfaces $S_1$ and $S_2$ is substantially perpendicular to the reference plane, in this embodiment, the surface of base 22; stated differently, it is generally preferred that the majority of the surface area of each of lateral surfaces $S_1$ and $S_2$ lie in a plane (or planes) that intersect(s) the reference plane (the surface of base 22, as illustrated) at an angle between about 80° and 100°, and more preferably at an angle of 90°±5°. It is also generally preferred that top surface T be substantially perpendicular to lateral surfaces $S_1$ and $S_2$ and substantially parallel to the reference plane, in this embodiment the surface of base 22. For example, in one presently preferred embodiment, base 22 has a substantially planar surface and anode structure 24 has a top surface T that is substantially parallel to the reference plane, i.e., the planar surface of the base 22 in this embodiment and lateral surfaces $S_1$ and $S_2$ are substantially perpendicular to the reference plane, i.e., the planar surface of the base 22 in this embodiment.

As illustrated, each anode structure 24 comprises an anode backbone 32 having thickness $T_3$ (measured from surface $S_3$ to $S_4$ in a direction parallel to the reference plane, the planar surface of base 22 as illustrated) and anodically active material layers 30, 31 having thicknesses $T_1$ (measured from surface $S_1$ to $S_3$ in a direction parallel to the reference plane, the planar surface of base 22 as illustrated) and $T_2$ (measured from surface $S_2$ to $S_4$ in a direction parallel to the reference plane, the planar surface of base 22 as illustrated) respectively. During a charging process, lithium (or other carrier) leaves cathode structures 26 and generally travels in the direction of arrows 23 through a separator (not shown) as lithium ions into anodically active material layers 30, 31. Depending on the anodically active material used, the lithium ions either intercalate (e.g., sit in a matrix of an anode material without forming an alloy) or form an alloy. During a discharge process, the lithium ions (or other carrier ions) leave the anodically active material layers 30, 31 and generally travel in the direction of arrows 21 through the separator (not shown) and into the cathodes 26. As illustrated in FIG. 2, the two cells are arranged vertically (i.e., in the Z-direction, as illustrated) and the shortest distance between the anodically active material layer and the cathode material of an individual cell is measured in a direction that is parallel to the reference plane, i.e., in this embodiment the substantially planar surface of base 22 (i.e., in the X-Y plane as illustrated), and orthogonal to the direction of stacking of the cells (i.e., in the Z-direction as illustrated). In another embodiment, the two cells are arranged horizontally (i.e., in the X-Y plane, as illustrated in FIG. 2), the shortest distance between the anodically active material layer and the cathode material of an individual cell is measured in a direction that is parallel to the reference plane, i.e., in this embodiment the substantially planar surface of base 22 (i.e., in the X-Y plane as illustrated), and the direction of stacking of the cells is also parallel to the reference plane (i.e., in the X-Y plane as illustrated in FIG. 2).

Anode backbone 32 provides mechanical stability for anodically active material layers 30, 31. Typically, anode backbone 32 will have a thickness $T_3$ (measured from back surface $S_3$ to back surface $S_4$ in a direction parallel to the surface of the reference plane, i.e., the substantially planar surface of base 22 as illustrated) of at least 1 micrometer. Anode backbone 32 may be substantially thicker, but generally will not have a thickness in excess of 100 micrometers. For example, in one embodiment, anode backbone 32 will have a thickness of about 1 to about 50 micrometers. In general, anode backbone will have a height (as measured in a direction perpendicular to the reference plane, i.e., the substantially planar surface of base 22 as illustrated) of at least about 50 micrometers, more typically at least about 100 micrometers. In general, however, anode backbone 32 will typically have a height of no more than about 10,000 micrometers, and more typically no more than about 5,000 micrometers. By way of example, in one embodiment, anode backbone 32 will have a thickness of about 5 to about 50 micrometers and a height of about 50 to about 5,000 micrometers. By way of further example, in one embodiment, anode backbone 32 will have a thickness of about 5 to about 20 micrometers and a height of about 100 to about 1,000 micrometers. By way of further example, in one embodiment, anode backbone 32 will have a thickness of about 5 to about 20 micrometers and a height of about 100 to about 2,000 micrometers.

Depending upon the application, anode backbone 32 may be electrically conductive or insulating. For example, in one embodiment the anode backbone 32 may be electrically conductive and may comprise a current collector for anodically active material layers 30,31. In one such embodiment, anode backbone comprises a current collector having a conductivity of at least about $10^3$ Siemens/cm. By way of further example, in one such embodiment, anode backbone comprises a current collector having a conductivity of at least about $10^4$ Siemens/cm. By way of further example, in one such embodiment, anode backbone comprises a current collector having a conductivity of at least about $10^5$ Siemens/cm. In other embodiments, anode backbone 32 is relatively nonconductive. For example, in one embodiment, anode backbone 32 has an electrical conductivity of less than 10 Siemens/cm. By way of further example in one embodiment, anode backbone 32 has an electrical conductivity of less than 1 Siemens/cm. By way of further example in one embodiment, anode backbone 32 has an electrical conductivity of less than $10^{-1}$ Siemens/cm.

Anode backbone 32 may comprise any material that may be shaped, such as metals, semiconductors, organics, ceramics, and glasses. Presently preferred materials include semiconductor materials such as silicon and germanium. Alternatively, however, carbon-based organic materials or metals, such as aluminum, copper, nickel, cobalt, titanium, and tungsten, may also be incorporated into anode backbone structures. In one exemplary embodiment, anode backbone 32 comprises silicon. The silicon, for example, may be single crystal silicon, polycrystalline silicon, amorphous silicon or a combination thereof.

Anodically active material layers 30, 31 are microstructured to provide a significant void volume fraction to accommodate volume expansion and contraction as lithium ions (or other carrier ions) are incorporated into or leave the anodically active material layers 30, 31 during charging and discharging processes. In general, the void volume fraction of the anodically active material layer is at least 0.1. Typically, however, the void volume fraction of the anodically active material layer is not greater than 0.8. For example, in one embodiment, the void volume fraction of the anodically active material layer is about 0.15 to about 0.75. By way of the further example, in one embodiment, the void volume fraction of the anodically active material layer is about 0.2 to about 0.7. By way of the further example, in one embodiment, the void volume fraction of the anodically active material layer is about 0.25 to about 0.6.

Depending upon the composition of the microstructured anodically active material layer and the method of its formation, the microstructured anodically active material layers may comprise macroporous, microporous or mesoporous material layers or a combination thereof such as a combination of microporous and mesoporous or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched or dendritic, and smooth or rough-walled. Additionally, the void volume may comprise open or closed voids, or a combination thereof. In one embodiment, the void volume comprises open voids, that is, the anodically active material layer contains voids having openings at the front surface (surfaces $S_1$, $S_2$ as illustrated in FIG. 2) of the anodically active material layer, the void openings facing the separator and the cathodically active material and through which lithium ions (or other carrier ions) can enter or leave the anodically active material layer; for example, lithium ions may enter the anodically active material layer through the void openings after leaving the cathodically active material and traveling to the anodically active material generally in the direction indicated by arrows 23. In another embodiment, the void volume comprises closed voids, that is, the anodically active material layer contains voids that are enclosed by anodically active material. In general, open voids can provide greater interfacial surface area for the carrier ions whereas closed voids tend to be less susceptible to solid electrolyte interface ("SEI") while each provides room for expansion of the anodically active material layer upon the entry of carrier ions. In certain embodiments, therefore, it is preferred that anodically active material layer comprise a combination of open and closed voids.

Anodically active material layers 30, 31 comprise an anodically active material capable of absorbing and releasing a carrier ion such as lithium. Such materials include carbon materials such as graphite, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, gold, silver, zinc, arsenic, hafnium, yttrium, and palladium. In one exemplary embodiment, anodically active material layers 30, 31 comprises aluminum, tin, or silicon, or an oxide thereof, a nitride thereof, a fluoride thereof, or other alloy thereof. In another exemplary embodiment, anodically active material layers 30, 31 comprise microstructured silicon or an alloy thereof. In one particularly preferred embodiment, anodically active material layers 30, 31 comprise porous silicon or an alloy thereof, fibers (e.g., nanowires) of silicon or an alloy thereof, a combination of porous silicon or an alloy thereof and fibers (e.g., nanowires) of silicon or an alloy thereof, or other forms of microstructured silicon or an alloy thereof having a void volume fraction of at least 0.1. In each of the embodiments and examples recited in this paragraph and elsewhere in this patent application, the anodically active material layer may be monolithic or a particulate agglomerate.

In general, anodically active material layers 30, 31 have front surfaces $S_1$, $S_2$, respectively, back surfaces, $S_3$, $S_4$, respectively and thicknesses $T_1$, $T_2$, respectively (measured in a direction parallel to the surface of base 22) of at least 1 micrometer. Typically, however, anodically active material layers 30, 31 will each have a thickness that does not exceed 200 micrometers. For example, in one embodiment, anodically active material layers 30, 31 will have a thickness of about 1 to about 100 micrometers. By way of further example, in one embodiment, anodically active material layers 30, 31 will have a thickness of about 2 to about 75 micrometers. By way of further example, in one embodiment, anodically active material layers 30, 31 have a thickness of about 10 to about 100 micrometers. By way of further example, in one embodiment, anodically active material layers 30, 31 have a thickness of about 5 to about 50 micrometers. By way of further example, in one such embodiment, anodically active material layers 30, 31 have a thickness of about 1 to about 100 micrometers and contain microstructured silicon and/or an alloy thereof such as nickel silicide. Additionally, in one embodiment, anodically active material layers 30, 31 will have a thickness of about 1 to about 50 micrometers and contain microstructured silicon and/or an alloy thereof such as nickel silicide. In general, anodically active material layers 30, 31 will have a height (as measured in a direction perpendicular to the reference plane, i.e., the substantially planar surface of base 22 as illustrated) of at least about 50 micrometers, more typically at least about 100 micrometers. In general, however, anodically active material layers 30, 31 will typically have a height of no more than about 10,000 micrometers, and more typically no more than about 5,000 micrometers. By way of example, in one embodiment, anodically active material layers 30, 31 will have a thickness of about 1 to about 200 micrometers and a height of about 50 to about 5,000 micrometers. By way of further example, in one embodiment, anodically active material layers 30, 31 will have a thickness of about 1 to about 50 micrometers and a height of about 100 to about 1,000 micrometers. By way of further example, in one embodiment, anodically active material layers 30, 31 will have a thickness of about 5 to about 20 micrometers and a height of about 100 to about 1,000 micrometers. By way of further example, in one embodiment, anodically active material layers 30, 31 will have a thickness of about 10 to about 100 micrometers and a height of about 100 to about 1,000 micrometers. By way of further example, in one embodiment, anodically active material layers 30, 31 will have a thickness of about 5 to about 50 micrometers and a height of about 100 to about 1,000 micrometers.

In one embodiment, microstructured anodically active material layers 30, 31 comprise porous aluminum, tin or silicon or an alloy thereof. Porous silicon layers may be formed, for example, by anodization, by etching (e.g., by depositing gold, platinum, or gold/palladium on the (100) surface of single crystal silicon and etching the surface with a mixture of hydrofluoric acid and hydrogen peroxide), or by other methods known in the art such as patterned chemical etching. Additionally, the anodically active material layer will generally have a porosity fraction of at least about 0.1 but less than 0.8 and have a thickness of about 1 to about 100 micrometers. For example, in one embodiment anodically active material layers 30, 31 comprise porous silicon, have a thickness of about 5 to about 100 micrometers, and have a porosity fraction of about 0.15 to about 0.75. By way of further example, in one embodiment, anodically active material layers 30, 31 comprise porous silicon, have a thickness of about 10 to about 80 micrometers, and have a porosity fraction of about 0.15 to about 0.7. By way of further example, in one such embodiment, anodically active material layers 30, 31 comprise porous silicon, have a thickness of about 20 to about 50 micrometers, and have a porosity fraction of about 0.25 to about 0.6. By way of further example, in one embodiment anodically active material layers 30, 31 comprise a porous silicon alloy (such as nickel silicide), have a thickness of about 5 to about 100 micrometers, and have a porosity fraction of about 0.15 to about 0.75. In each of the foregoing embodiments the thickness of the anodically active material layer will typically exceed the pore depth. Stated differently, the base of the pore (e.g., the surface of the pore proximate anode backbone 32 (see FIG. 2) will typically not occur at the boundary (i.e., surfaces $S_3$ and $S_4$ as depicted in FIG. 2) between the anodically active material layer and the anode backbone; instead, the boundary between the anodically active material layer and the anode backbone will occur at a greater depth (e.g., at a greater distance measured in the direction of arrow 23 in FIG. 2) from the base of the pore.

Figure 1:
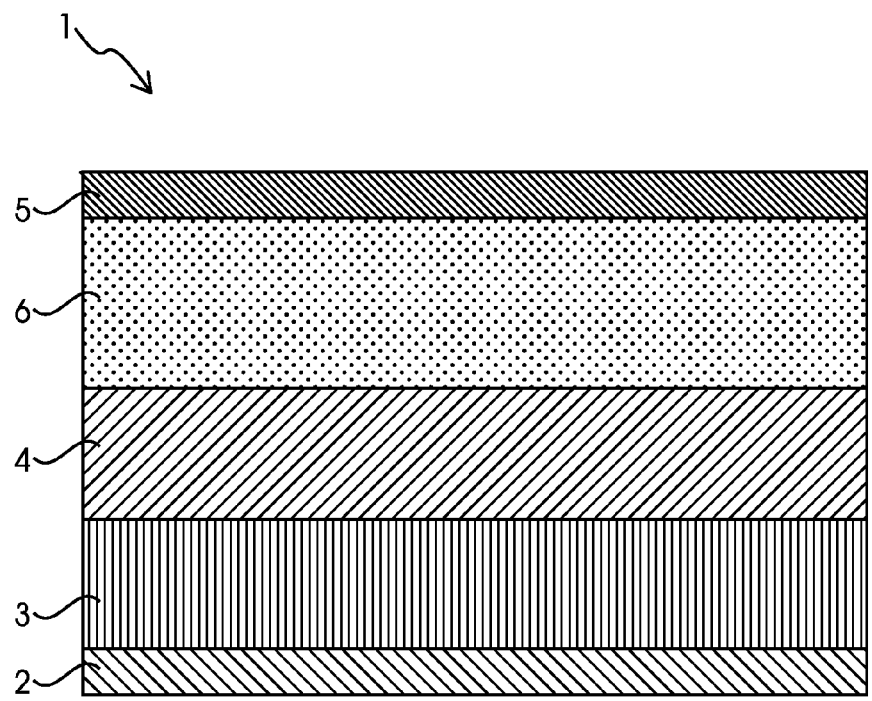
FIG. 1 is a generic cross-section of a cell of an electrochemical stack of an existing two-dimensional energy storage device such as a lithium ion battery.
Figure 3:
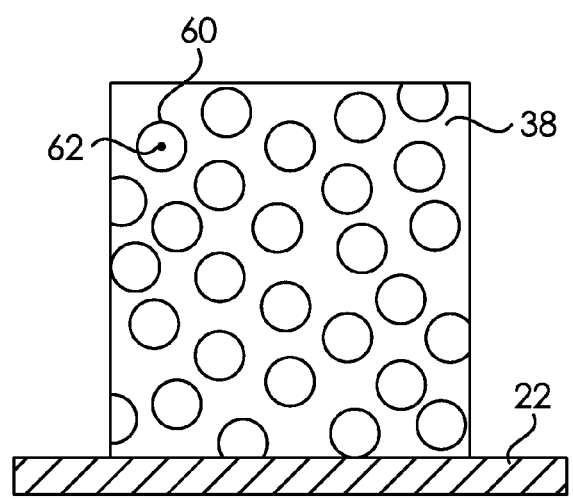
FIG. 3 is a fragmentary, cross-sectional view of an anodically active material layer comprising silicon taken along line 3-3 in FIG. 2.

Although there may be significant pore-to-pore variation, the pores of the porous silicon (or an alloy thereof) have major axes (sometimes referred to as a central axis) which are predominantly in the direction of the chemical or electrochemical etching process. Referring now to FIG. 3, when anodically active material layer 32 comprises porous silicon, pores 60 will have major axes 62 that are predominantly perpendicular to lateral surface $S_1$ (see FIG. 2) and generally parallel to a reference plane, in this embodiment the planar surface of base 22. Notably, when cells are stacked vertically as illustrated in FIG. 2, the major axes of the pores are generally orthogonal to the direction of stacking of the cells (that is, the major axes of the pores lie in the X-Y plane when the direction of stacking is in the Z-direction as illustrated in FIG. 2).

In another embodiment, microstructured anodically active material layers 30, 31 comprise fibers of aluminum, tin or silicon, or an alloy thereof. Individual fibers may have a diameter (thickness dimension) of about 5 nm to about 10,000 nm and a length generally corresponding to the thickness of the microstructured anodically active material layers 30, 31. Fibers (nanowires) of silicon may be formed, for example, by chemical vapor deposition or other techniques known in the art such as vapor liquid solid (VLS) growth and solid liquid solid (SLS) growth. Additionally, the anodically active material layer will generally have a porosity fraction of at least about 0.1 but less than 0.8 and have a thickness of about 1 to about 200 micrometers. For example, in one embodiment anodically active material layers 30, 31 comprise silicon nanowires, have a thickness of about 5 to about 100 micrometers, and have a porosity fraction of about 0.15 to about 0.75. By way of further example, in one embodiment, anodically active material layers 30, 31 comprise silicon nanowires, have a thickness of about 10 to about 80 micrometers, and have a porosity fraction of about 0.15 to about 0.7. By way of further example, in one such embodiment, anodically active material layers 30, 31 comprise silicon nanowires, have a thickness of about 20 to about 50 micrometers, and have a porosity fraction of about 0.25 to about 0.6. By way of further example, in one embodiment anodically active material layers 30, 31 comprise nanowires of a silicon alloy (such as nickel silicide), have a thickness of about 5 to about 100 micrometers, and have a porosity fraction of about 0.15 to about 0.75.

Although there may be significant fiber-to-fiber variation, nanowires of aluminum, tin or silicon (or an alloy thereof) have major axes (sometimes referred to as a central axis) which are predominantly perpendicular to the anode backbone (at the point of attachment of the nanowire to the microstructured anodically active material layer) and parallel to the surface of the base supporting the backbone (See FIG. 2). Notably, when cells are stacked vertically as illustrated in FIG. 2, the major axes of the fibers are generally orthogonal to the direction of stacking of the cells.

In another embodiment, microstructured anodically active material layers 30, 31 comprise nanowires of silicon or an alloy thereof and porous silicon or an alloy thereof. In such embodiments, the anodically active material layer will generally have a porosity fraction of at least about 0.1 but less than 0.8 and have a thickness of about 1 to about 100 micrometers as previously described in connection with porous silicon and silicon nanowires.

Referring again to FIG. 2, base 22 serves as a rigid backplane and may constitute any of a wide range of materials. For example, base 22 may comprise a ceramic, a glass, a polymer or any of a range of other materials that provide sufficient rigidity to the overall structure. In one embodiment, base 22 is insulating; for example, base 22 may have an electrical conductivity of less than 10 Siemens/cm. In one exemplary embodiment, base 22 may comprise a silicon-on-insulator structure. In some embodiments, however, base 22 may be removed after the electrochemical stack is formed.

Referring now to FIGS. 4A-4E, anode structures 24 and cathode structures 26 project from the same reference plane, in this embodiment, the planar surface of base 22 and are alternating in periodic fashion. Additionally, in each of FIGS. 4A-4E, each anode structure 24 contains at least one lateral surface between its bottom and top surfaces as described more fully in connection with FIG. 2 to support a population of microstructured anodically active material layers 30. For example, when anode structures 24 are in the shape of pillars (FIG. 4A), the microstructured anodically active material layer extends at least partially, and preferably fully about the circumference of the lateral surface. By way of further example, when anode structures 24 have two (or more) lateral surfaces as illustrated, for example, in FIGS. 4B-4E, the anodically active material layer at least partially covers, and preferably fully covers, at least one of the lateral surfaces.

Additionally, each of the microstructured anodically active material layers in the population has a height (measured in a direction perpendicular to base 22) and the layers are disposed such that the distance between at least two of the layers of the population, e.g., layers 30A and 30B, measured in a direction that is substantially parallel to the planar surface of base 22 is greater than the maximum height of any of the layers in the population. For example, in one embodiment, the distance between at least two of the layers of the population, e.g., layers 30A and 30B, is greater than the maximum height of any of the layers in the population by a factor of at least 2, and in some embodiments substantially more, e.g., by a factor of at least 5 or even 10. By way of further example, in one embodiment, the distance between a majority of the layers of the population is greater than the maximum height of any of the layers in the population by a factor of at least 2, and in some embodiments substantially more, e.g., by a factor of at least 5 or even 10.

Figure 4A:
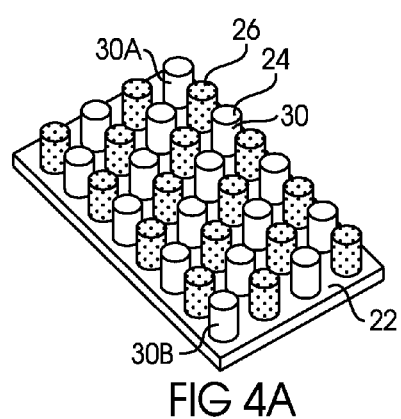
FIGS. 4A-4E are schematic illustrations of some shapes into which anode and cathode structures may be assembled according to certain embodiments of the present invention.

FIG. 4A shows a three-dimensional assembly with anode structures 24 and cathode structures 26 in the shape of pillars. Each of the pillars comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 4B:
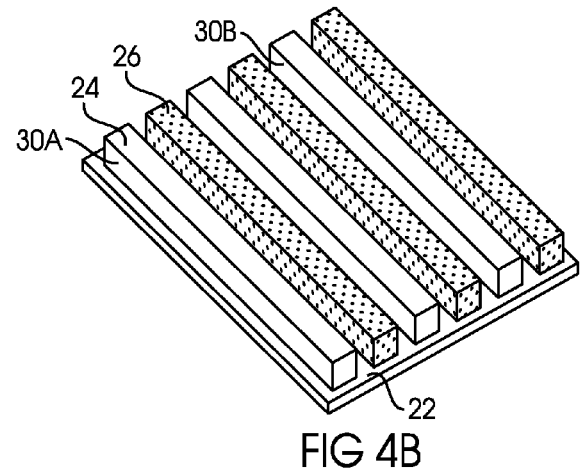

FIG. 4B shows a three-dimensional assembly with cathode structures 26 and anode structures 24 in the shape of plates. Each of the plates comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 4C:
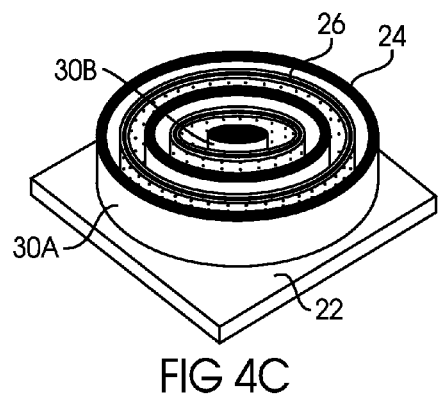

FIG. 4C shows a three-dimensional assembly with cathode structures 26 and anode structures 24 in the shape of concentric circles. Each of the concentric circles comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 4D:
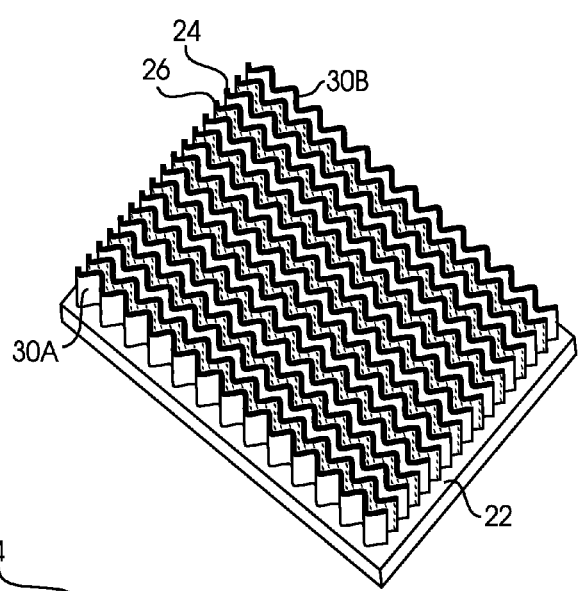

FIG. 4D shows a three-dimensional assembly with cathode structures 26 and anode structures 24 in the shape of waves. Each of the waves comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 4E:
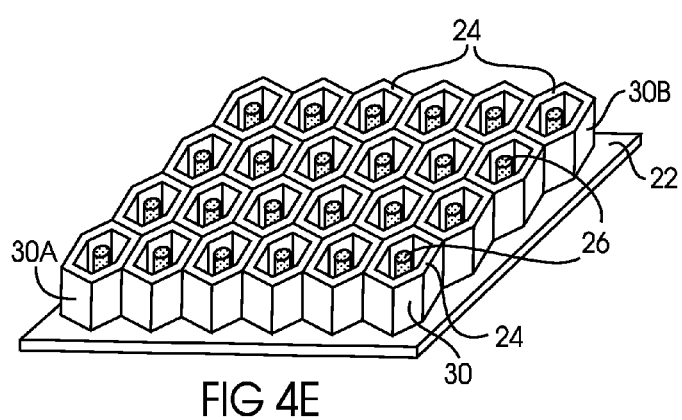

FIG. 4E shows a three-dimensional assembly with cathode structures 26 and anode structures 24 in a honeycomb pattern. The cathode structures 26 are in the shape of pillars at the center of each unit cell of the honeycomb structure and the walls of each unit cell of the honeycomb structure comprise an interconnected backbone network (system) having lateral surfaces (not shown) projecting vertically from base 22. The lateral surfaces of the backbone network (system) support anodically active material layers 30 and the layers 30 are disposed such that the distance between at least two of the layers of the population, e.g., layers 30A and 30B, is greater than the maximum height of any of the layers in the population. In an alternative embodiment, the three-dimensional assembly is a honeycomb structure, but the relative positions of the anode structures and cathode structures reversed relative to the embodiment depicted in FIG. 4E, i.e., in the alternative embodiment, the anode structures are in the shape of pillars (having lateral surfaces supporting anodically active material layers) and the walls of each unit cell comprise cathodically active material.

Independent of the geometry of the anode structures, in one embodiment an electrochromic stack comprises a population of microstructured anodically active material layers having at least 20 anodically active material layers as members. For example, in one embodiment, the population comprises at least 50 members. By way of further example, in one embodiment the population comprises at least 100 members. In other embodiments, the population may comprise at least 150, at least 200 or even at least 500 members.

Figure 5:
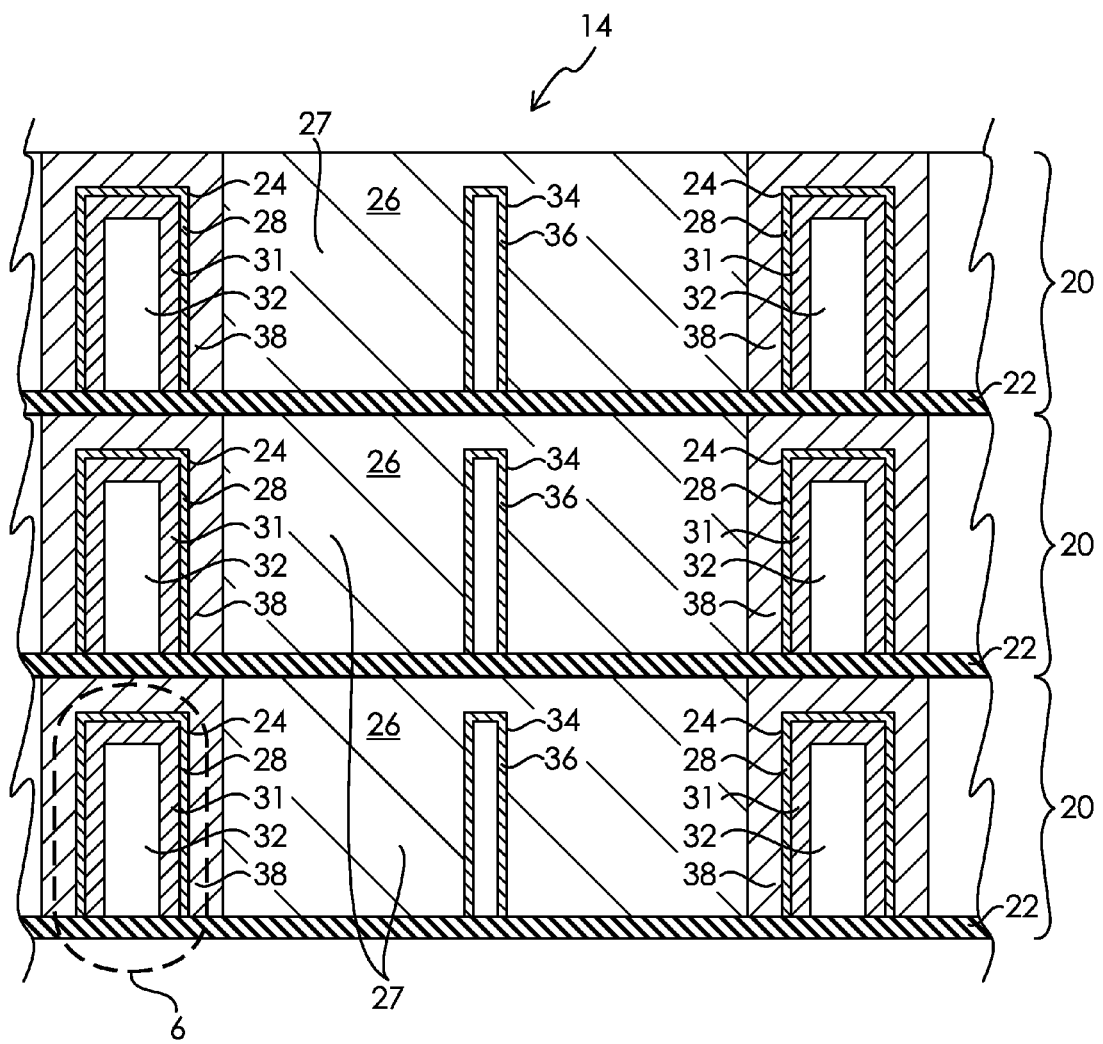
FIG. 5 is a fragmentary, cross-sectional view of three die, each comprising an electrochemical stack.

Referring now to FIG. 5, die stack 14 comprises three dies, each die 20 comprising a base 22 and an electrochemical stack comprising an alternating series of anode structures 24 and cathode structures 26 projecting from base 22. Each anode structure 24 comprises anode backbone 32, microstructured anodically active material layer 31, and anode current collector 28. Each cathode structure 26 comprises cathode material 27, cathode current collector 34 and cathode backbone 36. Separator 38 is positioned between each anode structure 24 and each cathode structure 26. In one embodiment, base 22 is removed and anode structures 24 and cathode structures 26 project from a common reference plane parallel to base 22.

For ease of illustration, only two anode structures 24 and only one cathode structure 26 are depicted in FIG. 5 for each die 20 and only three die appear in the vertical stack depicted in FIG. 5; in practice, however, each die will typically comprise an electrochemical stack comprising an alternating series of anode structures and cathode structures, with the number of anode structures and cathode structures per electrochemical stack and the number of dies in the vertical stack depending upon the application. For lithium ion batteries for portable electronics such as mobile phones and computers, for example, each die may contain about 20 to about 500 anode structures and an approximately equal number of cathode structures. For example, in one embodiment each die may contain at least 20, at least 50, at least 100, at least 150, at least 200 or even at least 500 anode structures and an approximately equal number of cathode structures. The size of the die may also vary substantially depending upon the application. For lithium ion batteries for portable electronics such as mobile phones and computers, for example, each die may have a size of 50 mm (L)×50 mm(W)×5 mm(H). Additionally, in one embodiment the dies are preferably stacked, relative to each other, in a direction that is orthogonal to the direction of stacking of the anode structures, separator layers, and cathode structures within an electrochemical stack of a die; stated differently each die is preferably stacked in a direction that is orthogonal to the substantially planar surface of each base 22 (or common reference plane) of an individual die. In one alternative embodiment, the dies are stacked, relative to each other, in a direction that is parallel to the direction of stacking of the anode structures, separator layers, and cathode structures within an electrochemical stack of a die; stated differently each die is preferably stacked in a direction that lies within a plane that is parallel to the substantially planar surface of each base 22 (or common reference plane) of an individual die.

Base 22 serves as a rigid backplane and may constitute any of a wide range of materials. As previously noted, base 22 may comprise a ceramic, a glass, a polymer or any of a range of other materials that provide sufficient rigidity and electrical insulation to the overall structure. In one embodiment, base 22 is removed or otherwise omitted (provided some structure or means are provided to prevent electrical shorting between the anode and the cathode structures) and the anode and cathode structures project from a common reference plane instead of a common base.

The overall size of the anode structure 24 may depend, in part, upon the application and, in part, upon manufacturing concerns. For lithium ion batteries for portable electronics such as mobile phones and computers, for example, each anode structure 24 will typically have a height, $H_A$, (as measured in a direction perpendicular to base 22) of at least about 50 micrometers, more typically at least about 100 micrometers. In general, however, the anode structure(s) will typically have a height of no more than about 10,000 micrometers, and more typically no more than about 5,000 micrometers. Additionally, the lineal distance between at least one pair of anodically active material layers 31 of the same electrochemical stack 20 preferably exceeds the maximum height, $H_A$, of a member of the population of anodically active material layers in the same electrochemical stack.

Referring again to FIG. 5, each anode structure 24 comprises an anode current collector layer 28 overlying and in contact with anodically active material layer 31 which, in turn, overlies and is contact with anode backbone 32. As carrier ions move between the anodically active material and the cathodically active material in such an electrochemical stack, therefore, they pass through the anode current collector layer 28 positioned between the separator and the anodically active material layer. In this embodiment, anode current collector layer 28 comprises an ionically permeable conductor that has sufficient ionic permeability to carrier ions to facilitate the movement of carrier ions from the separator to the anodically active material layer and sufficient electrical conductivity to enable it to serve as a current collector.

Being positioned between the anodically active material layer and the separator, the anode current collector layer may facilitate more uniform carrier ion transport by distributing current from the anode current collector across the surface of the anodically active material layer. This, in turn, may facilitate more uniform insertion and extraction of carrier ions and thereby reduce stress in the anodically active material during cycling; since the anode current collector layer distributes current to the surface of the anodically active material layer facing the separator, the reactivity of the anodically active material layer for carrier ions will be the greatest where the carrier ion concentration is the greatest.

In this embodiment, the anode current collector layer comprises an ionically permeable conductor material that is both ionically and electrically conductive. Stated differently, the anode current collector layer has a thickness, an electrical conductivity, and an ionic conductivity for carrier ions that facilitates the movement of carrier ions between an immediately adjacent active electrode material layer one side of the ionically permeable conductor layer and an immediately adjacent separator layer on the other side of the anode current collector layer in an electrochemical stack. On a relative basis, the anode current collector layer has an electrical conductance that is greater than its ionic conductance when there is an applied current to store energy in the device or an applied load to discharge the device. For example, the ratio of the electrical conductance to the ionic conductance (for carrier ions) of the anode current collector layer will typically be at least 1,000:1, respectively, when there is an applied current to store energy in the device or an applied load to discharge the device. By way of further example, in one such embodiment, the ratio of the electrical conductance to the ionic conductance (for carrier ions) of the anode current collector layer is at least 5,000:1, respectively, when there is an applied current to store energy in the device or an applied load to discharge the device. By way of further example, in one such embodiment, the ratio of the electrical conductance to the ionic conductance (for carrier ions) of the anode current collector layer is at least 10,000:1, respectively, when there is an applied current to store energy in the device or an applied load to discharge the device. By way of further example, in one such embodiment, the ratio of the electrical conductance to the ionic conductance (for carrier ions) of the anode current collector layer is at least 50,000:1, respectively, when there is an applied current to store energy in the device or an applied load to discharge the device. By way of further example, in one such embodiment, the ratio of the electrical conductance to the ionic conductance (for carrier ions) of the anode current collector layer is at least 100,000:1, respectively, when there is an applied current to store energy in the device or an applied load to discharge the device.

In one embodiment and when there is an applied current to store energy in the device or an applied load to discharge the device, such as when a secondary battery is charging or discharging, the anode current collector layer has an ionic conductance that is comparable to the ionic conductance of an adjacent separator layer. For example, in one embodiment the anode current collector layer has an ionic conductance (for carrier ions) that is at least 50% of the ionic conductance of the separator layer (i.e., a ratio of 0.5:1, respectively) when there is an applied current to store energy in the device or an applied load to discharge the device. By way of further example, in some embodiments the ratio of the ionic conductance (for carrier ions) of the anode current collector layer to the ionic conductance (for carrier ions) of the separator layer is at least 1:1 when there is an applied current to store energy in the device or an applied load to discharge the device. By way of further example, in some embodiments the ratio of the ionic conductance (for carrier ions) of the anode current collector layer to the ionic conductance (for carrier ions) of the separator layer is at least 1.25:1 when there is an applied current to store energy in the device or an applied load to discharge the device. By way of further example, in some embodiments the ratio of the ionic conductance (for carrier ions) of the anode current collector layer to the ionic conductance (for carrier ions) of the separator layer is at least 1.5:1 when there is an applied current to store energy in the device or an applied load to discharge the device. By way of further example, in some embodiments the ratio of the ionic conductance (for carrier ions) of the anode current collector layer to the ionic conductance (for (anode current collector layer) carrier ions) of the separator layer is at least 2:1 when there is an applied current to store energy in the device or an applied load to discharge the device.

In one embodiment, the anode current collector layer also has an electrical conductance that is substantially greater than the electrical conductance of the anodically active material layer. For example, in one embodiment the ratio of the electrical conductance of the anode current collector layer to the electrical conductance of the anodically active material layer is at least 100:1 when there is an applied current to store energy in the device or an applied load to discharge the device. By way of further example, in some embodiments the ratio of the electrical conductance of the anode current collector layer to the electrical conductance of the anodically active material layer is at least 500:1 when there is an applied current to store energy in the device or an applied load to discharge the device. By way of further example, in some embodiments the ratio of the electrical conductance of the anode current collector layer to the electrical conductance of the anodically active material layer is at least 1000:1 when there is an applied current to store energy in the device or an applied load to discharge the device. By way of further example, in some embodiments the ratio of the electrical conductance of the anode current collector layer to the electrical conductance of the anodically active material layer is at least 5000:1 when there is an applied current to store energy in the device or an applied load to discharge the device. By way of further example, in some embodiments the ratio of the electrical conductance of the anode current collector layer to the electrical conductance of the anodically active material layer is at least 10,000:1 when there is an applied current to store energy in the device or an applied load to discharge the device.

The thickness of the anode current collector layer (i.e., the shortest distance between the separator and the anodically active material layer between which the anode current collector layer is sandwiched) in this embodiment will depend upon the composition of the layer and the performance specifications for the electrochemical stack. In general, when an anode current collector layer is an ionically permeable conductor layer, it will have a thickness of at least about 300 Angstroms. For example, in some embodiments it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the anode current collector layer will have a thickness in the range of about 0.1 to about 10 micrometers. By way of further example, in some embodiments, the anode current collector layer will have a thickness in the range of about 0.1 to about 5 micrometers. By way of further example, in some embodiments, the anode current collector layer will have a thickness in the range of about 0.5 to about 3 micrometers. In general, it is preferred that the thickness of the anode current collector layer be approximately uniform. For example, in one embodiment it is preferred that the anode current collector layer have a thickness non-uniformity of less than about 25% wherein thickness non-uniformity is defined as the quantity of the maximum thickness of the layer minus the minimum thickness of the layer, divided by the average layer thickness. In certain embodiments, the thickness variation is even less. For example, in some embodiments the anode current collector layer has a thickness non-uniformity of less than about 20%. By way of further example, in some embodiments the anode current collector layer has a thickness non-uniformity of less than about 15%. In some embodiments the ionically permeable conductor layer has a thickness non-uniformity of less than about 10%.

In one preferred embodiment, the anode current collector layer is an ionically permeable conductor layer comprising an electrically conductive component and an ion conductive component that contribute to the ionic permeability and electrical conductivity. Typically, the electrically conductive component will comprise a continuous electrically conductive material (such as a continuous metal or metal alloy) in the form of a mesh or patterned surface, a film, or composite material comprising the continuous electrically conductive material (such as a continuous metal or metal alloy). Additionally, the ion conductive component will typically comprise pores, e.g., interstices of a mesh, spaces between a patterned metal or metal alloy containing material layer, pores in a metal film, or a solid ion conductor having sufficient diffusivity for carrier ions. In certain embodiments, the ionically permeable conductor layer comprises a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In the embodiment illustrated in FIG. 5, anode current collector layer 28 is the sole anode current collector for anodically active material layer 31. Stated differently, in this embodiment anode backbone 32 does not comprise an anode current collector. In certain other embodiments, however, anode backbone 32 may optionally comprise an anode current collector.

Each cathode structure 26 may comprise any of a range of cathode active materials 27, including mixtures of cathode active materials. For example, for a lithium-ion battery, a cathode material, such as $LiCoO_2$, $LiNi_{0.5}Mn_{1.5}O_4$, $Li(Ni_xCo_yAl_z)O_2$, $LiFePO_4$, $Li_2MnO_4$, $V_2O_5$, and molybdenum oxysulfides. The cathode active material be deposited to form the cathode structure by any of a range of techniques including, for example, electrophoretic deposition, electrodeposition, co-deposition or slurry deposition. In one exemplary embodiment, one of the aforementioned cathode active materials, or a combination thereof, in particulate form is electrophoretically deposited. In another exemplary embodiment, a cathode active material such as $V_2O_5$ is electrodeposited. In another exemplary embodiment, one of the aforementioned cathode active materials, or a combination thereof, in particulate form is co-deposited in a conductive matrix such as polyaniline. In another exemplary embodiment, one of the aforementioned cathode active materials, or a combination thereof, in particulate form is slurry deposited. Independent of the method of deposition, the cathode active material layer will typically have a thickness between 1 micron and 1 mm. In certain embodiments, the layer thickness is between 5 microns and 200 microns, and in certain embodiments, the layer thickness is between 10 microns and 150 microns.

Each cathode structure 26 further comprises a cathode current collector 34 which, in the embodiment illustrated in FIG. 5, overlies cathode support 36. Cathode current collector 34 may comprise any of the metals previously identified for the anode current collector; for example, in one embodiment, cathode current collector 34 comprises aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, cathode current collector layer 34 comprises gold or an alloy thereof such as gold silicide. By way of further example, in one embodiment, cathode current collector layer 34 comprises nickel or an alloy thereof such as nickel silicide.

Similarly, cathode support 36 may comprise any of the materials previously identified for the anode backbone. Presently preferred materials include semiconductor materials such as silicon and germanium. Alternatively, however, carbon-based organic materials or metals, such as platinum, rhodium, aluminum, gold, nickel, cobalt, titanium, tungsten, and alloys thereof may also be incorporated into cathode support structures. Typically, the cathode support will have a height of at least about 50 micrometers, more typically at least about 100 micrometers, and any of a range of thicknesses (including the minimum) permitted by the fabrication method being used. In general, however, cathode support 36 will typically have a height of no more than about 10,000 micrometers, and more typically no more than about 5,000 micrometers. Additionally, in such embodiments, the cathode current collector 34 will have a thickness in the range of about 0.5 to 50 micrometers.

In an alternative embodiment, the positions of the cathode current collector layer and the cathode active material layer are reversed relative to their positions as depicted in FIG. 5. Stated differently, in some embodiments, the cathode current collector layer is positioned between the separator layer and the cathodically active material layer. In such embodiments, the cathode current collector for the immediately adjacent cathodically active material layer comprises an ionically permeable conductor having a composition and construction as described in connection with the anode current collector layer; that is, the cathode current collector layer comprises a layer of an ionically permeable conductor material that is both ionically and electrically conductive. In this embodiment, the cathode current collector layer has a thickness, an electrical conductivity, and an ionic conductivity for carrier ions that facilitates the movement of carrier ions between an immediately adjacent cathodically active material layer on one side of the cathode current collector layer and an immediately adjacent separator layer on the other side of the cathode current collector layer in an electrochemical stack. On a relative basis in this embodiment, the cathode current collector layer has an electrical conductance that is greater than its ionic conductance when there is an applied current to store energy in the device or an applied load to discharge the device. For example, the ratio of the electrical conductance to the ionic conductance (for carrier ions) of the cathode current collector layer will typically be at least 1,000:1, respectively, when there is an applied current to store energy in the device or an applied load to discharge the device. By way of further example, in one such embodiment, the ratio of the electrical conductance to the ionic conductance (for carrier ions) of the cathode current collector layer is at least 5,000:1, respectively, when there is an applied current to store energy in the device or an applied load to discharge the device. By way of further example, in one such embodiment, the ratio of the electrical conductance to the ionic conductance (for carrier ions) of the cathode current collector layer is at least 10,000:1, respectively, when there is an applied current to store energy in the device or an applied load to discharge the device. By way of further example, in one such embodiment, the ratio of the electrical conductance to the ionic conductance (for carrier ions) of the cathode current collector layer is at least 50,000:1, respectively, when there is an applied current to store energy in the device or an applied load to discharge the device. By way of further example, in one such embodiment, the ratio of the electrical conductance to the ionic conductance (for carrier ions) of the cathode current collector layer is at least 100,000:1, respectively, when there is an applied current to store energy in the device or an applied load to discharge the device.

When there is an applied current to store energy in the device or an applied load to discharge the device in this embodiment, such as when a secondary battery is charging or discharging, the cathode current collector layer has an ionic conductance that is comparable to the ionic conductance of an adjacent separator layer. For example, in one embodiment the cathode current collector layer has an ionic conductance (for carrier ions) that is at least 50% of the ionic conductance of the separator layer (i.e., a ratio of 0.5:1, respectively) when there is an applied current to store energy in the device or an applied load to discharge the device. By way of further example, in some embodiments the ratio of the ionic conductance (for carrier ions) of the cathode current collector layer to the ionic conductance (for carrier ions) of the separator layer is at least 1:1 when there is an applied current to store energy in the device or an applied load to discharge the device. By way of further example, in some embodiments the ratio of the ionic conductance (for carrier ions) of the cathode current collector layer to the ionic conductance (for carrier ions) of the separator layer is at least 1.25:1 when there is an applied current to store energy in the device or an applied load to discharge the device. By way of further example, in some embodiments the ratio of the ionic conductance (for carrier ions) of the cathode current collector layer to the ionic conductance (for carrier ions) of the separator layer is at least 1.5:1 when there is an applied current to store energy in the device or an applied load to discharge the device. By way of further example, in some embodiments the ratio of the ionic conductance (for carrier ions) of the cathode current collector layer to the ionic conductance (for (cathode current collector layer) carrier ions) of the separator layer is at least 2:1 when there is an applied current to store energy in the device or an applied load to discharge the device.

In this embodiment in which the cathode current collector layer is between the cathodically active material layer and the separator, the cathode current collector comprises an ionically permeable conductor layer having an electrical conductance that is substantially greater than the electrical conductance of the cathodically active material layer. For example, in one embodiment the ratio of the electrical conductance of the cathode current collector layer to the electrical conductance of the cathodically active material layer is at least 100:1 when there is an applied current to store energy in the device or an applied load to discharge the device. By way of further example, in some embodiments the ratio of the electrical conductance of the cathode current collector layer to the electrical conductance of the cathodically active material layer is at least 500:1 when there is an applied current to store energy in the device or an applied load to discharge the device. By way of further example, in some embodiments the ratio of the electrical conductance of the cathode current collector layer to the electrical conductance of the cathodically active material layer is at least 1000:1 when there is an applied current to store energy in the device or an applied load to discharge the device. By way of further example, in some embodiments the ratio of the electrical conductance of the cathode current collector layer to the electrical conductance of the cathodically active material layer is at least 5000:1 when there is an applied current to store energy in the device or an applied load to discharge the device. By way of further example, in some embodiments the ratio of the electrical conductance of the cathode current collector layer to the electrical conductance of the cathodically active material layer is at least 10,000:1 when there is an applied current to store energy in the device or an applied load to discharge the device.

The thickness of the cathode current collector layer (i.e., the shortest distance between the separator and the cathodically active material layer between which the cathode current collector layer is sandwiched) in this embodiment will depend upon the composition of the layer and the performance specifications for the electrochemical stack. In general, when a cathode current collector layer is an ionically permeable conductor layer, it will have a thickness of at least about 300 Angstroms. For example, in some embodiments it may have a thickness in the range of about 300-800 Angstroms. More typically, however, it will have a thickness greater than about 0.1 micrometers. In this embodiment, a cathode current conductor will typically have a thickness not greater than about 100 micrometers. Thus, for example, in one embodiment, the cathode current collector layer will have a thickness in the range of about 0.1 to about 10 micrometers. By way of further example, in some embodiments, the cathode current collector layer will have a thickness in the range of about 0.1 to about 5 micrometers. By way of further example, in some embodiments, the cathode current collector layer will have a thickness in the range of about 1 to about 3 micrometers. In general, it is preferred that the thickness of the cathode current collector layer be approximately uniform. For example, in one embodiment it is preferred that the ionically permeable conductor layer have (cathode current conductor) a thickness non-uniformity of less than about 25% wherein thickness non-uniformity is defined as the quantity of the maximum thickness of the layer minus the minimum thickness of the layer, divided by the average layer thickness. In certain embodiments, the thickness variation is even less. For example, in some embodiments the cathode current collector layer has a thickness non-uniformity of less than about 20%. By way of further example, in some embodiments the cathode current collector layer has a thickness non-uniformity of less than about 15%. In some embodiments the cathode current collector layer has a thickness non-uniformity of less than about 10%.

In one preferred embodiment, the cathode current collector layer is an ionically permeable conductor layer comprising an electrically conductive component and an ion conductive component that contribute to the ionic permeability and electrical conductivity as described in connection with the anode current collector. Typically, the electrically conductive component will comprise a continuous electrically conductive material (such as a continuous metal or metal alloy) in the form of a mesh or patterned surface, a film, or composite material comprising the continuous electrically conductive material (such as a continuous metal or metal alloy). Additionally, the ion conductive component will typically comprise pores, e.g., interstices of a mesh, spaces between a patterned metal or metal alloy containing material layer, pores in a metal film, or a solid ion conductor having sufficient diffusivity for carrier ions. In certain embodiments, the ionically permeable conductor layer comprises a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In one embodiment, the ionically permeable conductor layer comprised by an electrode current collector layer (i.e., an anode current collector layer or a cathode current collector layer) comprises a mesh positioned between a separator layer and an electrode active material layer. The mesh has interstices defined by mesh strands of an electrically conductive material. For example, when electrode active material layer is an anodically active material layer, the mesh may comprise strands of carbon, cobalt, chromium, copper, nickel, titanium, or an alloy of one or more thereof. By way of further example, when electrode active material layer is a cathodically active material layer, the mesh may comprise strands of aluminum, carbon, chromium, gold, NiP, palladium, rhodium, ruthenium, titanium, or an alloy of one or more thereof. In general, the mesh will have a thickness (i.e., the strands of the mesh have a diameter) of at least about 2 micrometers. In one exemplary embodiment, the mesh has a thickness of at least about 4 micrometers. In another exemplary embodiment, the mesh has a thickness of at least about 6 micrometers. In another exemplary embodiment, the mesh has a thickness of at least about 8 micrometers. In each of the foregoing embodiments, the open area fraction of the mesh (i.e., the fraction of the mesh constituting the interstices between mesh strands) is preferably at least 0.5. For example, in each of the foregoing embodiments, the open area fraction of the mesh may be at least 0.6. By way of further example, in each of the foregoing embodiments, the open area fraction of the mesh may be at least 0.75. By way of further example, in each of the foregoing embodiments, the open area fraction of the mesh may be at least 0.8. In general, however, in each of the foregoing embodiments, the ratio of the average distance between the strands of the mesh to the thickness of the electrode active material layer is no more than 100:1, respectively. For example, in each of the foregoing embodiments, the ratio of the average distance between the mesh strands to the thickness of the electrode active material layer is no more than 50:1, respectively. By way of further example, in each of the foregoing embodiments, the ratio of the average distance between the mesh strands to the thickness of the electrode active material layer is no more than 25:1. Advantageously, one or both ends of the mesh may be welded or otherwise connected to metal tabs or other connectors to enable collected current to be carried to the environment outside the battery.

In one embodiment, the ionically permeable conductor layer comprised by an electrode current collector layer (i.e., an anode current collector layer or a cathode current collector layer) comprises a mesh of a metal or an alloy thereof as previously described, and the interstices between the strands of the mesh are open, filled with a porous material that may be permeated with electrolyte, or they contain a nonporous material through which the carrier ions may diffuse. When filled with a porous material, the porous material will typically have a void fraction of at least about 0.5, and in some embodiments, the void fraction will be at least 0.6, 0.7 or even at least about 0.8. Exemplary porous materials include agglomerates of a particulate ceramic such as $SiO_2$, $Al_2O_3$, SiC, or $Si_3N_4$ and agglomerates of a particulate polymer such as polyethylene, polypropylene, polymethylmethacrylates and copolymers thereof. Exemplary nonporous materials that may be placed in the interstices of the mesh include solid ion conductors such as $Na_3Zr_2Si_2PO_{12}$ (NASICON), $Li_{2+2x}Zn_{1-x}GeO_4$ (LISICON), and lithium phosphorous oxynitride (LiPON).

In one embodiment, the ionically permeable conductor layer comprised by an electrode current collector layer (i.e., an anode current collector layer or a cathode current collector layer) comprises conductive lines deposited or otherwise formed on the surface of the immediately adjacent separator layer or the immediately adjacent electrode active material layer (i.e., the immediately adjacent anodically active material layer or the immediately adjacent cathodically active material layer). In this embodiment, the conductive lines may comprise any of the metals (or alloys thereof) previously identified in connection with the mesh component. For example, when the ionically permeable conductor layer is positioned between a separator layer and an anodically active material layer, the conductive lines may comprise carbon, cobalt, chromium, copper, nickel, titanium, or an alloy of one or more thereof. When the ionically permeable conductor layer is positioned between a separator layer and a cathodically active material layer, the conductive lines may comprise aluminum, carbon, chromium, gold, NiP, palladium, rhodium, ruthenium, titanium, or an alloy of one or more thereof. In general, the conductive lines will have a thickness of at least about 2 micrometers. In one exemplary embodiment, the conductive lines have a thickness of at least about 4 micrometers. In another exemplary embodiment, the conductive lines have a thickness of at least about 6 micrometers. In another exemplary embodiment, the conductive lines have a thickness of at least about 8 micrometers. In each of the foregoing embodiments, the ratio of the average distance between the conductive lines to the thickness of the electrode active material layer is no more than 100:1, respectively. For example, in each of the foregoing embodiments, the ratio of the average distance between the conductive lines to the thickness of the electrode active material layer is no more than 50:1, respectively. By way of further example, in each of the foregoing embodiments, the ratio of the average distance between the conductive lines to the thickness of the electrode active material layer is no more than 25:1, respectively. Advantageously, one or more ends of the conductive lines may be welded or otherwise connected to metal tabs or other connectors to enable collected current to be carried to the environment outside the battery.

In one embodiment, the ionically permeable conductor layer comprised by an electrode current collector layer (i.e., an anode current collector layer or a cathode current collector layer) comprises a conductive line of a metal or an alloy thereof as previously described, the spaces on the surface of the coated material may be open, they may be filled with a porous material that may be permeated with electrolyte, or they may contain a nonporous material through which the carrier ions may diffuse. When filled with a porous material, the porous material will typically have a void fraction of at least about 0.5, and in some embodiments, the void fraction will be at least 0.6, 0.7 or even at least about 0.8. Exemplary porous materials include agglomerates of a particulate ceramic such as $SiO_2$, $Al_2O_3$, SiC, or $Si_3N_4$ and agglomerates of a particulate polymer such as polyethylene, polypropylene, polymethylmethacrylates and copolymers thereof. Exemplary nonporous materials that may be placed between the conductive lines include solid ion conductors such as $Na_3Zr_2Si_2PO_{12}$ (NASICON), $Li_{2+2x}Zn_{1-x}GeO_4$ (LISICON), and lithium phosphorous oxynitride (LiPON).

In one embodiment, the ionically permeable conductor layer comprised by an electrode current collector layer (i.e., an anode current collector layer or a cathode current collector layer) comprises a porous layer or film such as a porous metal layer. For example when the electrode active material layer is an anodically active material layer, the porous layer may comprise a porous layer of carbon, cobalt, chromium, copper, nickel, titanium, or an alloy of one or more thereof. By way of further example, when electrode active material layer is a cathodically active material layer, the porous layer may comprise a porous layer of aluminum, carbon, chromium, gold, NiP, palladium, rhodium, ruthenium, titanium, or an alloy of one or more thereof. Exemplary deposition techniques for the formation of such porous layers include electroless deposition, electro deposition, vacuum deposition techniques such as sputtering, displacement plating, vapor deposition techniques such as chemical vapor deposition and physical vapor deposition, co-deposition followed by selective etching, and slurry coating of metal particles with a binder. In general, it is preferred that the void fraction of such porous layers be at least 0.25. For example, in one embodiment the void fraction of a porous metal layer will be at least 0.4, at least 0.5, at least 0.6, at least 0.7 and up to about 0.75. To provide the desired electrical conductance, the layer will typically have a thickness of at least about 1 micrometer. In some embodiments, the layer will have a thickness of at least 2 micrometers. In some embodiments, the layer will have a thickness of at least 5 micrometers. In general, however, the layer will typically have a thickness that does not exceed 20 micrometers, and more typically does not exceed about 10 micrometers. Optionally, such metal layers or films may contain a binder such as polyvinylidene fluoride (PVDF) or other polymeric or ceramic material.

In yet another alternative embodiment, the ionically permeable conductor layer comprised by an electrode current collector layer (i.e., an anode current collector layer or a cathode current collector layer) comprises a metal-filled ion conducting polymer composite film. For example, the ionically permeable conductor layer may comprise an ionically conducting film such as polyethylene oxide or gel polymer electrolytes containing a conductive element such as aluminum, carbon, gold, titanium, rhodium, palladium, chromium, NiP, or ruthenium, or an alloy thereof. Typically, however, solid ion conductors have relatively low ionic conductivity and, thus, the layers need to be relatively thin to provide the desired ionic conductance. For example, such layers may have a thickness in the range of about 0.5 to about 10 micrometers.

In yet another alternative embodiment, the ionically permeable conductor layer comprised by an electrode current collector layer (i.e., an anode current collector layer or a cathode current collector layer) comprises a porous layer of a metal or a metal alloy, preferably one which does not form an intermetallic compound with lithium. In this embodiment, for example, the ionically permeable conductor layer may comprise at least one metal selected from the group consisting of copper, nickel, and chromium, or an alloy thereof. For example, in one such embodiment, the electrode current collector layer comprises porous copper, porous nickel, a porous alloy of copper or nickel, or a combination thereof. By way of further example, in one such embodiment, the electrode current collector layer comprises porous copper or an alloy thereof such as porous copper silicide. By way of further example, in one such embodiment, the electrode current collector layer comprises porous nickel or a porous alloy thereof such as porous nickel silicide. In each of the foregoing embodiments recited in this paragraph, the thickness of the electrode current collector layer (i.e., the shortest distance between the immediately adjacent electrode active material layer and the immediately adjacent separator layer) will generally be at least about 0.1 micrometers, and typically in the range of about 0.1 to 10 micrometers. In each of the foregoing embodiments recited in this paragraph, the electrode current collector layer may be porous with a void fraction of in the range of about 0.25 to about 0.85 and, in certain embodiments, in the range of about 0.35 to about 0.45.

In one preferred embodiment, an anode current collector layer is formed by a process comprising a displacement plating step. In this embodiment, anodically active material layer preferably comprises silicon and the layer is contacted with a solution comprising ions of a metal and a dissolution component for dissolving part of the silicon. The silicon is dissolved, the metal in solution is reduced by electrons provided by the dissolution of the silicon, and the metal is deposited on the anodically active material layer, and annealing to form a metal-silicon alloy layer. The "dissolution component" refers to a constituent that promotes dissolution of the semiconductor material. Dissolution components include fluoride, chloride, peroxide, hydroxide, permanganate, etc. Preferred dissolution components are fluoride and hydroxide. Most preferred dissolution component is fluoride. The metal may be any of the aforementioned metals, with nickel and copper being preferred. Advantageously, the resulting layer will be porous, having a void fraction of about 0.15 to about 0.85. Additionally, the thickness of the resulting ionically permeable conductor layer can be controlled to be between about 100 nanometers and 3 micrometers; if desired, thicker layers can be formed.

Referring again to FIG. 5, separator layer 38 is positioned between each anode structure 24 and each cathode structure 26. Separator layer 38 may comprise any of the materials conventionally used as secondary battery separators including, for example, microporous polyethylenes, polypropylenes, $TiO_2$, $SiO_2$, $Al_2O_3$, and the like (P. Arora and J. Zhang, "Battery Separators" Chemical Reviews 2004, 104, 4419-4462). Such materials may be deposited, for example, by electrophoretic deposition of a particulate separator material, slurry deposition (including spin or spray coating) of a particulate separator material, or sputter coating of an ionically conductive particulate separator material. Separator layer 38 may have, for example, a thickness (the distance separating an adjacent anodic structure and an adjacent cathodic structure) of about 5 to 100 micrometers and a void fraction of about 0.25 to about 0.75.

In operation, the separator may be permeated with a non-aqueous electrolyte containing any non-aqueous electrolyte that is conventionally used for non-aqueous electrolyte secondary batteries. Typically, the non-aqueous electrolyte comprises a lithium salt dissolved in an organic solvent. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

Figure 6:
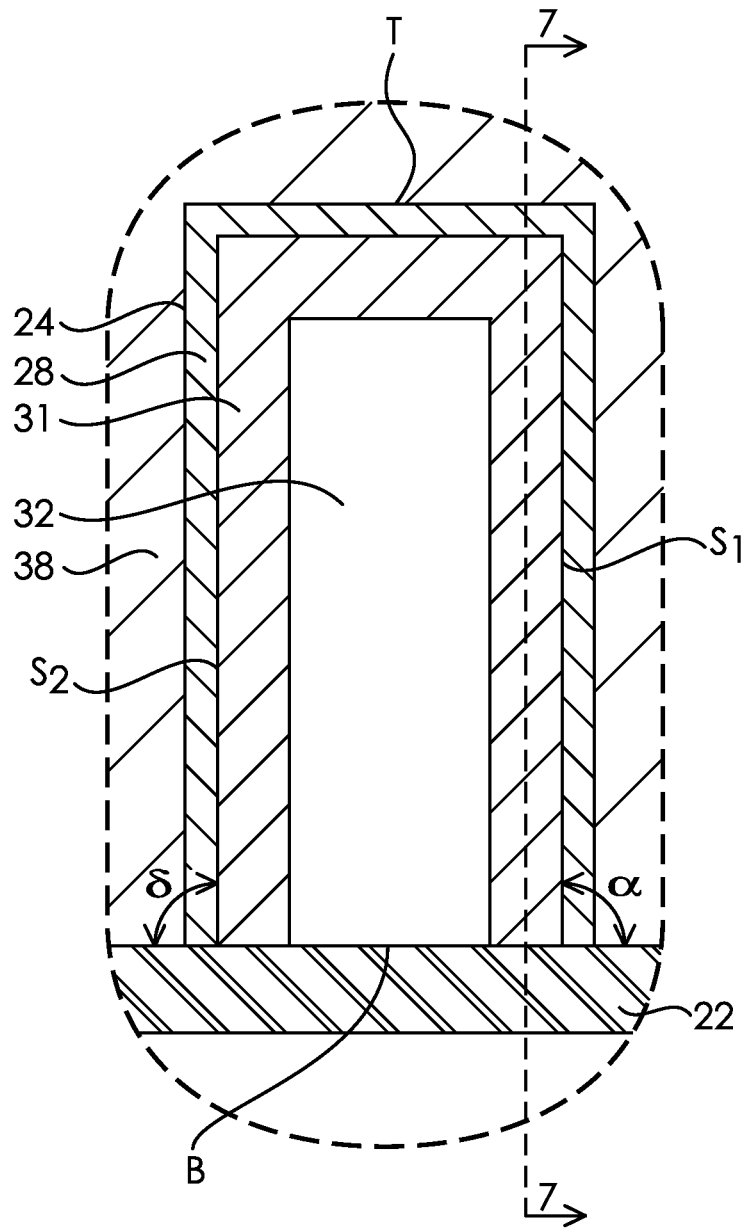
FIG. 6 is a view of an anode structure of one of dies of FIG. 5.

Referring now to FIG. 6, anode structure 24 has a bottom surface B proximate to base 22, a top surface T distal to base 22 and lateral surfaces $S_1$, $S_2$ extending from top surface T to bottom surface B. Lateral surface $S_1$ intersects the surface of base 22 at angle α and lateral surface $S_2$ intersects the surface of base 22 at angle δ relative to the surface of base 22. In a preferred embodiment, α and δ are approximately equal and between about 80° and 100°. For example, in one embodiment, α and δ are approximately equal and are 90°±5°. In a particularly preferred embodiment, α and δ are substantially the same and approximately 90°. Independent of the angle of intersection, it is generally preferred that the majority of the surface area of each of lateral surfaces $S_1$ and $S_2$ is substantially perpendicular to the reference plane, in this embodiment, the surface of base 22; stated differently, it is generally preferred that the majority of the surface area of each of lateral surfaces $S_1$ and $S_2$ lie in a plane (or planes) that intersect(s) the reference plane (the surface of base 22, as illustrated) at an angle between about 80° and 100°, and more preferably at an angle of 90°±5°. It is also generally preferred that top surface T be substantially perpendicular to lateral surfaces $S_1$ and $S_2$ and substantially parallel to the surface of base 22. For example, in one presently preferred embodiment, base 22 has a substantially planar surface and anode structure 24 has a top surface T that is substantially parallel to the planar surface of the base 22 and lateral surfaces $S_1$ and $S_2$ are substantially perpendicular to the planar surface of the base 22.

Figure 7:
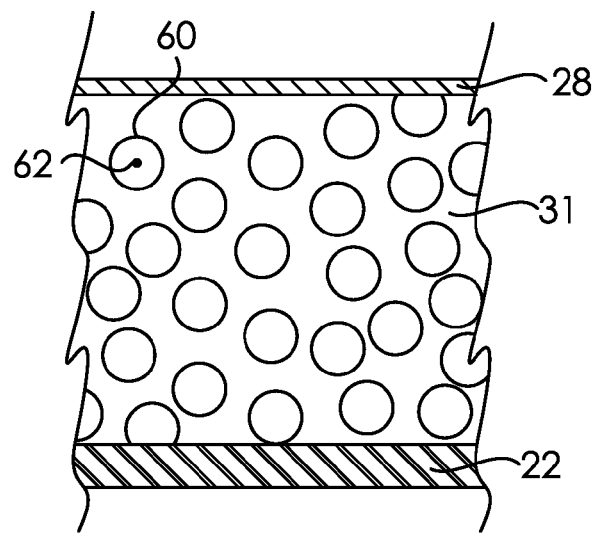
FIG. 7 is a fragmentary, cross-sectional view of an anodically active material layer comprising porous silicon taken along line 7-7 in FIG. 6.

Referring now to FIG. 7, porous layer 31 comprises an anodically active material having pores 60 and pore axes 62. In a preferred embodiment, the anodically active material comprises porous silicon or an alloy of silicon such as nickel silicide. Although the size, shape and symmetry of pores 60 may be diverse, pore axes 62 will be (i) predominantly perpendicular to lateral surface $S_1$ in regions of porous layer 31 proximate lateral surface $S_1$, (ii) predominantly perpendicular to lateral surface $S_2$ in regions of porous layer 31 proximate lateral surface $S_2$, and (iii) predominantly perpendicular to top surface T in regions of porous layer 31 proximate top surface T (see FIG. 6). Accordingly, when lateral surfaces $S_1$ and $S_2$ are substantially perpendicular to the surface of base 22, pore axes 62 will be (i) predominantly parallel to the surface of base 22 in regions of porous layer 31 proximate lateral surfaces $S_1$ and $S_2$, and (iii) predominantly perpendicular to the surface of base 22 in regions of porous layer 31 proximate top surface T (see FIG. 6). Additionally, in one embodiment the pore dimension, wall dimension, pore depth and pore morphology in the region of porous layer 31 that is proximate the top T may differ from the wall dimension, pore depth and pore morphology in the region of porous layer 31 proximate surfaces $S_1$ and $S_2$.

Figure 8:
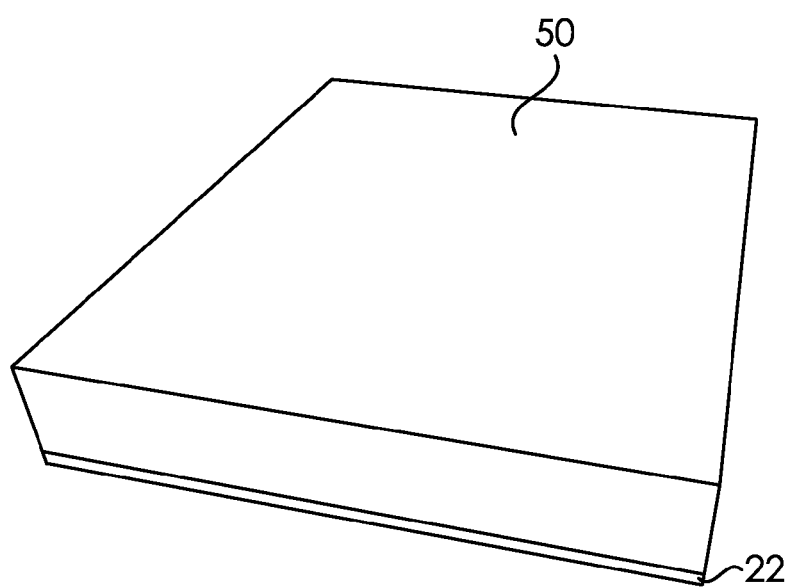
FIG. 8 is a schematic illustration of a starting material for a step of manufacturing an anode backbone and a cathode support structure of the present invention.
Figure 9:
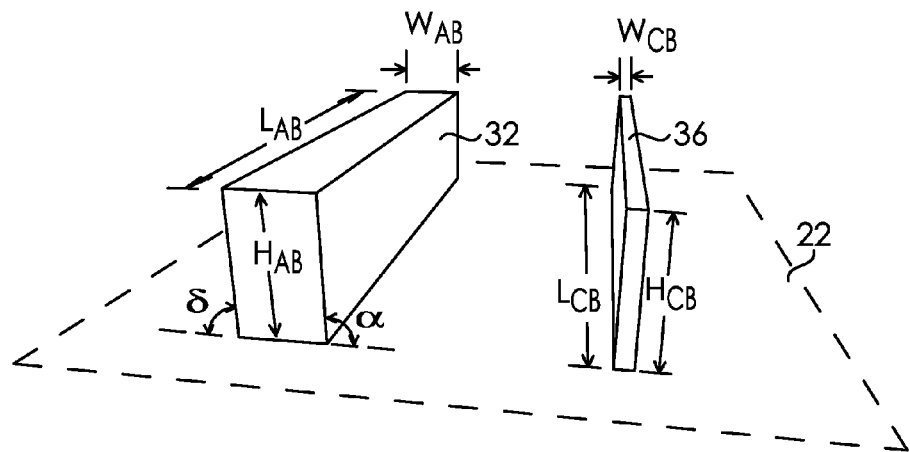
FIG. 9 is a schematic illustration of an exemplary anode backbone and a cathode support structure formed in accordance with one embodiment of a process of the present invention.

FIGS. 8-9 depict a schematic representation of one embodiment of a process for manufacturing an anode backbone and a cathode support of the present invention. Referring now to FIG. 8, a silicon wafer 50 is attached by conventional means to base 22. The base may have the same dimensions as, or may be dimensionally larger or smaller than the substrate. For example, wafer 50 and base 22 may be anodically bonded together, adhered using an adhesive, or a polymer layer may be formed in situ. As previously noted, base 50 may comprise a layer of a glass, ceramic, polymer or other material that provides sufficient rigidity in subsequent processing steps. Alternatively, a silicon-on-insulator wafer may be used as the starting material.

Referring now to FIG. 9, a photoresist is patterned onto wafer 50 to provide the desired backbone structures and chemically etched to provide an anode backbone and a cathode support. The resulting anode backbone 32 has length $L_{AB}$, height $H_{AB}$, and width $W_{AB}$ wherein height $H_{AB}$ is measured in a direction perpendicular to the surface of base 22 and length $L_{AB}$ and width $W_{AB}$ are measured in a direction that is parallel to the surface of base 22; typically, $W_{AB}$ will be at least 5 micrometers, $H_{AB}$ will be at least 50 micrometers and $L_{AB}$ will be at least 1,000 micrometers. The resulting cathode support 36 has length $L_{CB}$, height $H_{CB}$, and width $W_{CB}$ wherein height $H_{CB}$ is measured in a direction perpendicular to the surface of base 22 and length $L_{CB}$ and width $W_{CB}$.

After the anode backbone and cathode supports are formed in the illustrated embodiment, cathode support is masked and anode backbone 32 is treated to form a layer of microstructured silicon having a void volume fraction of at least 0.1 on anode backbone 32 as previously described. The cathode may then be unmasked and an anode current collector is formed on the anodically active material layer and a cathode current collector is formed on the cathode support. After a cathode material is selectively deposited on the cathode current collector, the separator may be deposited between the cathode material and the anode current collector, the respective current collectors are connected to battery tabs, and the whole assembly is inserted into a conventional battery pouch, filled with a conventional lithium battery electrolyte containing a lithium salt, and a mixture of organic carbonates (Propylene Carbonate+Ethylene Carbonate), and sealed using a vacuum sealer with the wires extending out of the pouch in order to make the electrical connection. In one alternative embodiment, two or more die, each containing one or more anodes and one or more cathodes assembled as described are placed in a stack and electrically connected to battery tabs before the entire assembly is inserted into a conventional battery pouch, etc., to form the battery.

Figure 10:
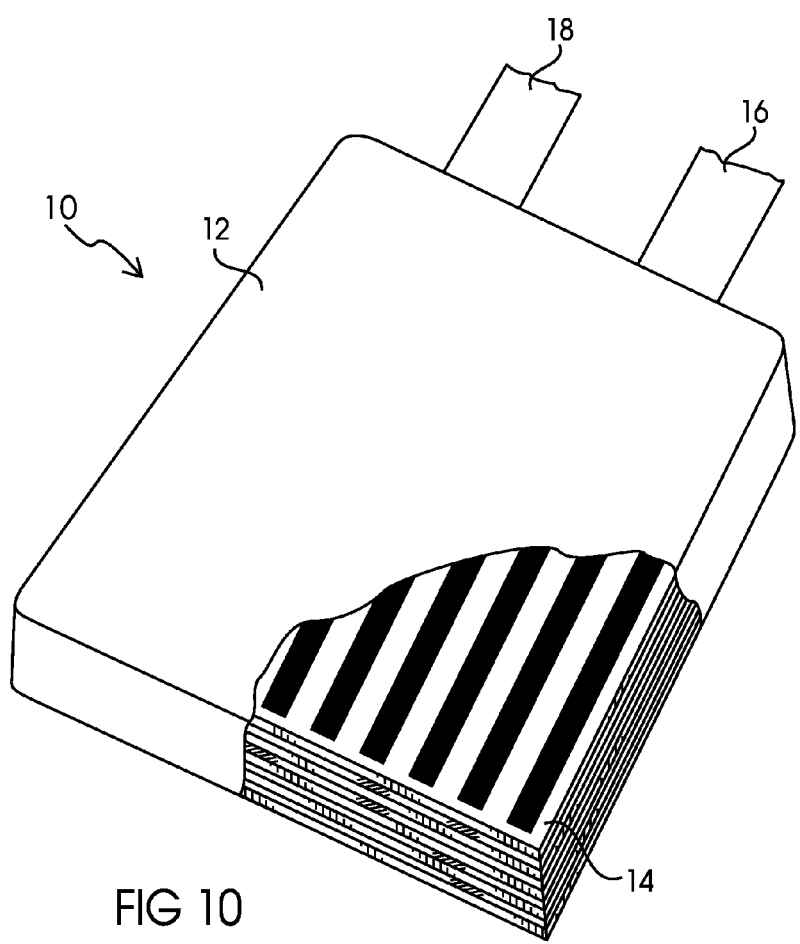
FIG. 10 is a schematic illustration of a secondary battery of the present invention.

Referring now to FIG. 10, one embodiment of a three-dimensional battery 10 of the present invention comprises battery enclosure 12, die stack 14, and tabs 16, 18 for electrically connecting die stack 14 to an external energy supply or consumer (not shown). For lithium ion batteries for portable electronics such as mobile phones and computers, for example, battery enclosure 12 may be a pouch or other conventional battery enclosure. Die stack 14 comprises several dies, each die comprising a battery cell having a series of interdigitated anodes and cathodes with the anodes being electrically connected to tab 16 and the cathodes being electrically connected to tab 18. The number of die in a vertical stack is not critical and may range, for example, from 1 to 50, with 2 to 20 die in a stack being typical.

Figure 11:
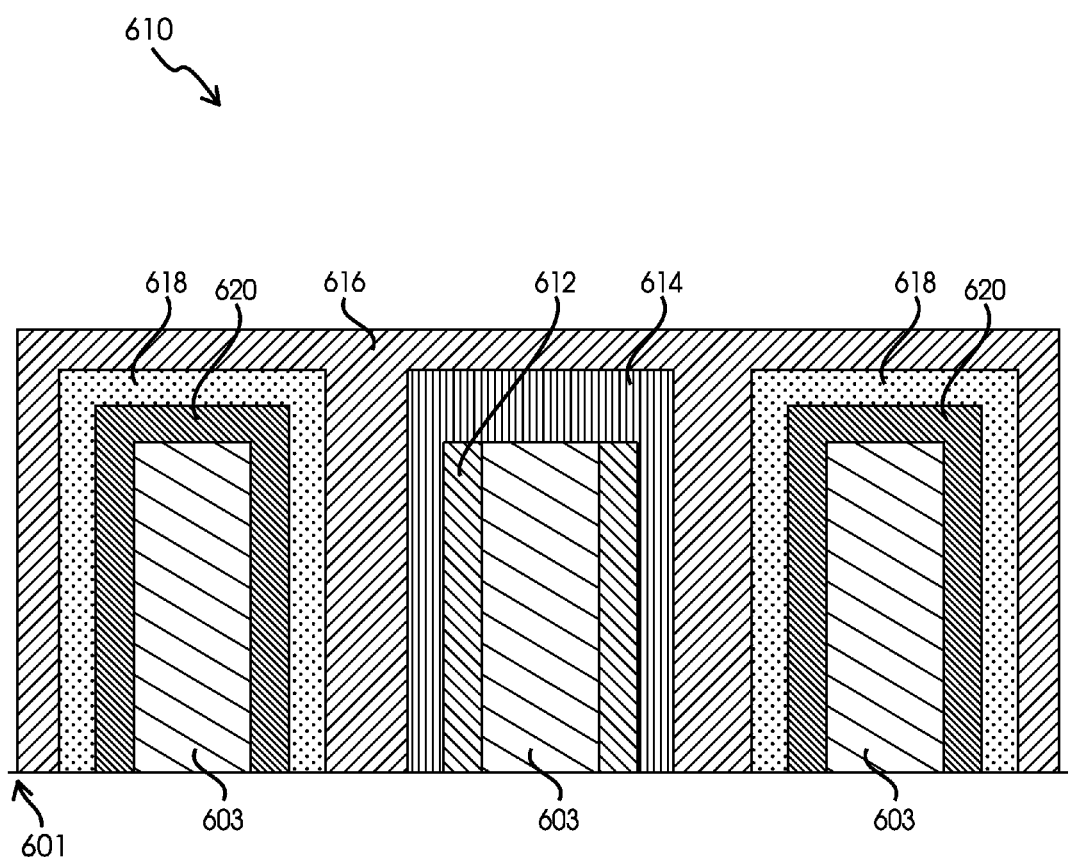
FIG. 11 is a schematic view of a 3-dimensional electrochemical stack of an energy storage device according to an alternative embodiment of the present invention.

Referring now to FIG. 11, in one embodiment an electrochemical stack 610 comprises reference plane 601 and backbones 603 projecting generally vertically from reference plane 601. The cathodic elements of electrochemical stack 610 comprise cathode current collector layers 620 and cathode active material layers 618. The anodic elements of electrochemical stack 610 comprise anodic active material layers 612 and ionically permeable conductor layer 614 which also serves as an anodic current collector layer. Preferably, ionically permeable conductor layer 614 has a thickness at the top of backbone 603, i.e., the surface of backbone distal to reference plane 601, that is greater than the thickness of ionically permeable layer on the lateral sides of backbone 603 (the surfaces between the top and reference plane 601); for example, in one embodiment, the thickness of the ionically permeable conductor at the top of the backbone is 110% to 2,000% of the thickness of the ionically permeable conductor on the lateral surfaces. By way of further example, in one embodiment the thickness at the top of the backbone is 200% to 1,000% of the thickness of the ionically permeable conductor on the lateral surfaces. In one embodiment, the permeability of the ionically permeable conductor to at the top of the backbone is less permeable to carrier ions (e.g., lithium ions) than is the ionically permeable conductor on the lateral surfaces, and may even be impermeable to carrier ions. Separator layer 616 is between ionically permeable conductor layer 614 and cathodically active material layers 618. Cathode current collector layers 620 are electrically connected to the cathode contact (not shown) and ionically permeable conductor layer 614 is electrically connected to the anode contact (not shown). For ease of illustration, only one anode backbone and only two cathode backbones are depicted in FIG. 11; in practice, however, an electrochemical stack will typically comprise an alternating series of anode and cathode backbones, with the number per stack depending upon the application.

Figure 12:
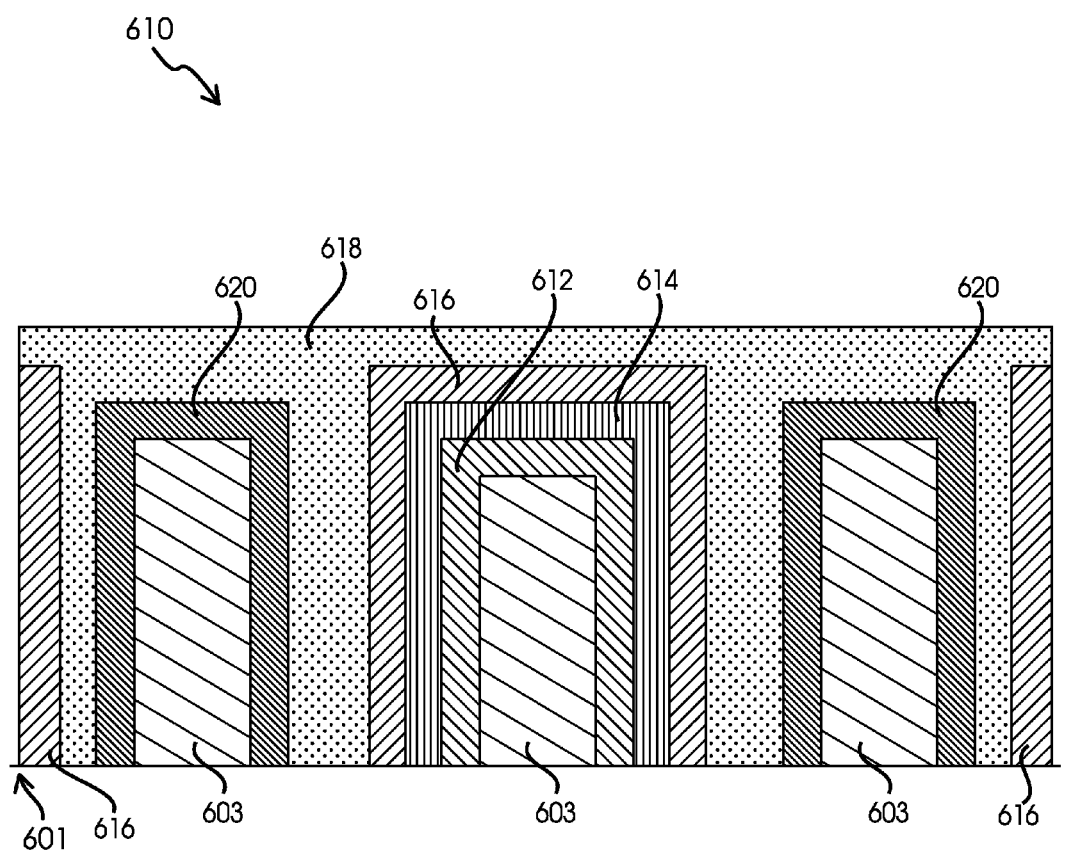
FIG. 12 is a schematic view of a 3-dimensional electrochemical stack of an energy storage device according to an alternative embodiment of the present invention.

Referring now to FIG. 12, in one embodiment an electrochemical stack 610 comprises reference plane 601 and backbones 603 projecting generally vertically from reference plane 601. The cathodic elements of electrochemical stack 610 comprise cathode current collector layers 620 and cathode active material layers 618. The anodic elements of electrochemical stack 610 comprise anodic active material layers 612 and ionically permeable conductor layer 614 which also serves as an anodic current collector layer. Separator layer 616 is between ionically permeable conductor layer 614 and cathodically active material layers 618. In this embodiment, anodic active material layer 612 is on the top and lateral surfaces of backbone 603 and cathodic active material 618 is proximate the top and lateral surfaces of backbone 603. As a result, during charging and discharging of an energy storage device comprising electrochemical stack 610, carrier ions are simultaneously moving in two directions relative to reference plane 601: carrier ions are moving in a direction generally parallel to reference plane 601 (to enter or leave anodically active material 612 on the lateral surface of backbone 603) and in a direction generally orthogonal to the reference plane 601 (to enter or leave anodically active material 612 at the top surface of backbone 603). Cathode current collector layers 620 are electrically connected to the cathode contact (not shown) and ionically permeable conductor layer 614 is electrically connected to the anode contact (not shown). For ease of illustration, only one anode backbone and only two cathode backbones are depicted in FIG. 12; in practice, however, an electrochemical stack will typically comprise an alternating series of anode and cathode backbones, with the number per stack depending upon the application.

Figure 13:
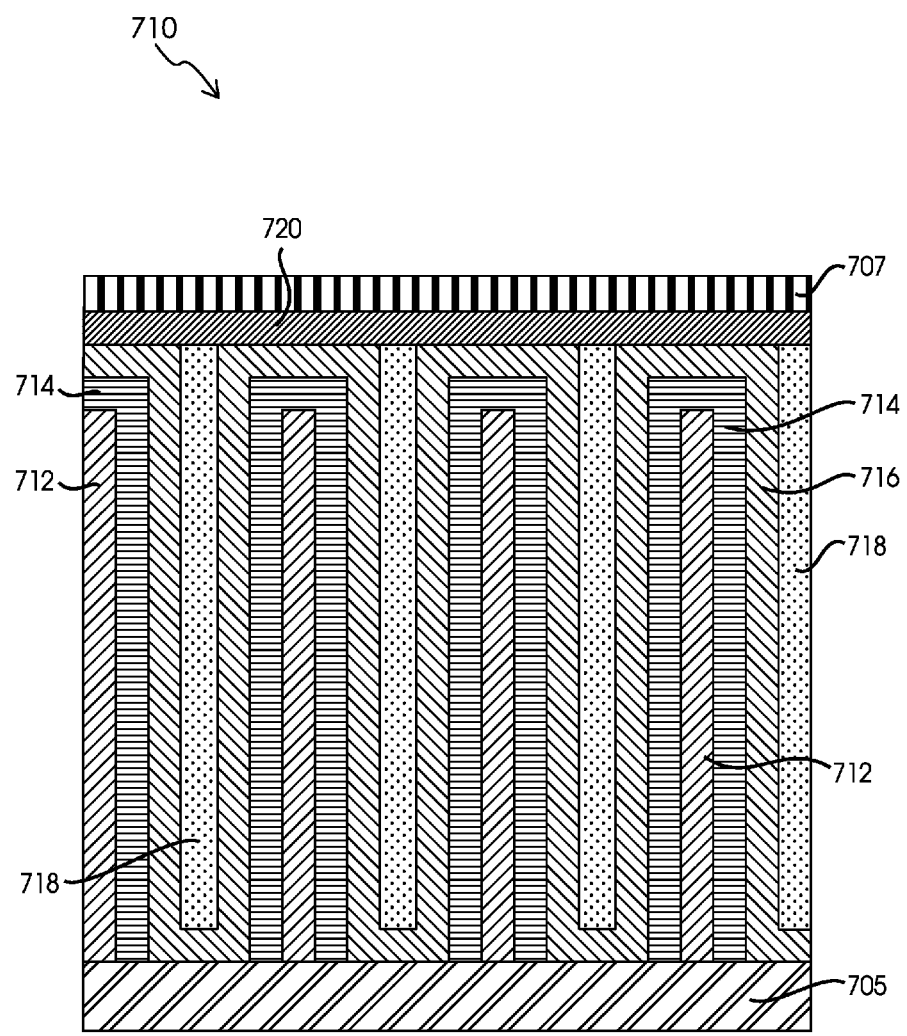
FIG. 13 is a schematic view of an interdigitated 3-dimensional electrochemical stack of an energy storage device according to an alternative embodiment of the present invention.

Referring now to FIG. 13, in one embodiment an electrochemical stack 710 comprises interdigitated anodically active material layers 712 and cathodically material layers 718. The cathodic elements of electrochemical stack 710 further comprise cathode current collector layer 720 and the anodic elements of the electrochemical stack comprise ionically permeable conductor layer 714 which functions as the anode current collector. Separator 716 is between ionically permeable conductor layer 714 and cathodically active material layer 718. Support layers 705, 707 provide mechanical support for interdigitated anodically active material layers 712. Although not shown in FIG. 12, in one embodiment, anodically active material layers 712 and cathodically active material layers 718 and may be supported by backbones, as illustrated in and described in connection with FIG. 2.

The following non-limiting examples are provided to further illustrate the present invention.

EXAMPLES

Example 1

A silicon on insulator (SOI) wafer with a layer thickness of 100 μm/1 μm/675 μm (device layer/insulating layer/backing layer) was used as the sample. A hard mask layer of 2000 Å silicon dioxide was sputter deposited on top of the device silicon layer. This wafer was then spin coated with 5 μm of resist and patterned with a mask to obtain a honeycomb shaped structure with the honeycomb wall thickness of 100 µm and the gap thickness of 200 µm. The photoresist was then used as a photomask to remove the silicon dioxide by ion milling.

The combination of silicon dioxide and photoresist was used as a mask for silicon removal using Deep Reactive Ion Etching (DRIE) in a fluoride plasma. The DRIE was performed until the silicon constituting the device layer in the honeycomb gaps was completely removed, stopping on the oxide layer. The overetch time used was 10% of the total DRIE time in order to remove islands of silicon in the trench floor. Any top photoresist was removed by stripping in acetone.

The top masking oxide layer was removed by dipping the sample for 1 minute in dilute (5:1) Buffered Oxide Etch (BOE):water solution. The dissolution time is tailored so that the insulating oxide layer in the bottom of the trench is not completely etched off.

The silicon sample was then inserted into an evaporation chamber, and 100 Å Au is deposited on the sample surface. This process resulted in Au on the top of the honeycomb structures, its sidewalls, as well as on the bottom oxide layer. The silicon backing layer was protected at this time by an adhesive tape mask. This sample was subsequently immersed in a solution of 1:1 by volume of hydrofluoric acid (49%) and hydrogen peroxide (30%) at 30 C to form a porous silicon layer. The porous silicon depth was tailored by varying the etching time. The approximate rate of formation of porous silicon was 750-1000 nm/min. The parts were removed and dried when the target pore depth of 30 µm was reached. The resulting porous silicon layer had a void volume fraction of approximately 0.3.

Figure 14:
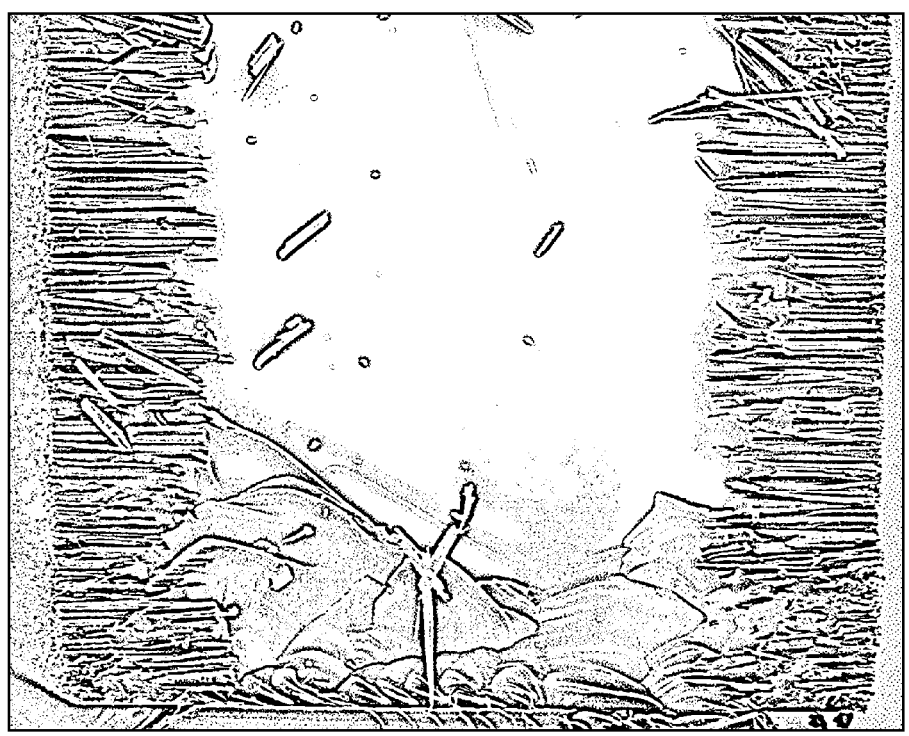
FIG. 14 is a photograph of a porous silicon layer on a silicon backbone prepared as described in Example 1.

The sample was then dried, cross-sectioned and photographed. As illustrated in FIG. 14 the pores of the dried and cross-sectioned sample are oriented predominantly in the direction parallel to the base oxide layer.

Example 2

A silicon on insulator (SOI) wafer with a layer thickness of 100 µm/1 µm/675 µm (device layer/insulating layer/backing layer) was used as the sample. 1000 Å of Pd was sputter deposited on top of the device layer followed by a hard mask layer of 2000 Å silicon dioxide. This wafer was then spin coated with 5 µm of resist and patterned with a mask to obtain a comb shaped structure with two interdigitated combs isolated from each other as shown in FIG. 3. The two interdigitated combs also have a landing pad on each side that may be isolated and serve as the contact pad for processing and for the final battery. The photoresist was then used as a photomask to remove the silicon dioxide and palladium by ion milling.

The combination of silicon dioxide, photoresist, and Pd was used as a mask for silicon removal using Deep Reactive Ion Etching (DRIE) in a fluoride plasma. The DRIE was performed until the silicon constituting the device layer in the mask gaps was completely removed, stopping on the oxide layer. The overetch time used was 10% of the total DRIE time in order to remove islands of silicon in the trench floor. Any top photoresist was removed by stripping in acetone. At this point, the two combs had been electrically isolated by the DRIE.

The top masking oxide layer was removed by dipping the sample for 1 minute in dilute (5:1) Buffered Oxide Etch (BOE) solution. The dissolution time was tailored so that the insulating oxide layer in the bottom of the trench was not completely etched off.

One of the isolated pair of comb like structures was electrically connected through the palladium conductor and immersed in an electrophoretic resist bath. A commercially available electrophoretic resist was used (Shipley EAGLE), and the comb was electrophoretically deposited at 50 V for 120 seconds to form a resist coating. The die was baked at 120 C for 30 min to harden the resist. This resist acts as a protection layer during the subsequent metal deposition step.

The silicon sample was then inserted into an evaporation chamber, and 100 Å Au was deposited on the sample surface. This Au deposition process resulted in Au on the top of the comb, its sidewalls, and on the bottom oxide layer. However, the photoresist being present on one of the combs causes the Au to be in contact with the silicon on only one of the two comb structures. The silicon backing layer was also protected at this time by an adhesive tape mask. This sample was subsequently immersed in a solution of 1:1 by volume of hydrofluoric acid (49%) and hydrogen peroxide (30%), at 30 C to form a porous silicon layer. The porous silicon depth was tailored by varying the etching time. The approximate rate of formation of porous silicon was 750-1000 nm/min. The parts were removed and dried when a the target pore depth of 30 µm was reached. The resulting porous silicon layer had a void volume fraction of approximately 0.3.

The porous silicon was formed only on the comb-set that did not have the electrophoretic resist patterned onto it. The porous silicon set may then be used as the anode in a lithium ion battery. The electrophoretic resist was subsequently stripped in acetone for 15 minutes.

Example 3

A silicon on insulator (SOI) wafer with a layer thickness of 100 µm/1 µm/675 µm (device layer/insulating layer/backing layer) was used as the sample. 1000 Å of Pd was sputter deposited on top of the device layer followed by a hard mask layer of 2000 Å silicon dioxide. This wafer was then spin coated with 5 µm of resist and patterned with a mask to obtain a comb shaped structure with two interdigitated combs isolated from each other as shown in FIG. 3. The two interdigitated combs also have a landing pad on each side that may be isolated and serve as the contact pad for processing and for the final battery. The photoresist was then used as a photomask to remove the silicon dioxide and Palladium by Ion Milling.

The combination of silicon dioxide, photoresist, and Pd was used as a mask for silicon removal using Deep Reactive Ion Etching (DRIE) in a fluoride plasma. The DRIE was performed until the silicon constituting the device layer in the mask gaps was completely removed, stopping on the oxide layer. The overetch time used was 10% of the total DRIE time in order to remove islands of silicon in the trench floor. Any top photoresist was removed by stripping in acetone. At this point, the two combs had been electrically isolated by the DRIE.

The top masking oxide layer was removed by dipping the sample for 1 minute in dilute (5:1) Buffered Oxide Etch (BOE) solution. The dissolution time was tailored so that the insulating oxide layer in the bottom of the trench was not completely etched off.

One of the isolated pair of comb like structures was electrically connected through the palladium conductor and immersed in an electrophoretic resist bath. A commercially available electrophoretic resist was used (Shipley EAGLE), and the comb was electrophoretically deposited at 50 V for 120 seconds to form a resist coating. The die was baked at 120 C for 30 min to harden the resist.

The silicon sample was then inserted into an evaporation chamber, and 20 Å Au is deposited on the sample surface. This Au deposition process resulted in Au on the comb, its sidewalls, as well as on the bottom oxide layer. However, the photoresist being present on one of the combs causes the Au to be in contact with the silicon on only one of the two comb structures. The silicon backing layer was protected at this time by an adhesive tape mask. The sample was subsequently immersed in acetone for 15 min to remove the electrophoretic resist along with the evaporated Au on top of the electrophoretic resist. This isolates the Au nanoclusters to one of the two isolated combs.

Silicon nanowires were then grown on top of one of the comb structures by CVD method. The sample is inserted into a CVD chamber and heated to 550 C. Silane gas was introduced into the chamber and the reactor pressure was kept at 10 Torr. The silicon nanowires grew on the surface that had the Au deposited on it. The deposition rate was 4 µm/hr; and the deposition was done to a target nanowire thickness of 20 µm. Since the Au was in contact with only one of the silicon wavesets, the wires start growing out of this waveset outward, in the direction parallel to the bottom oxide layer. The resulting silicon nanowire layer had a void volume fraction of approximately 0.5.

Example 4

A silicon on insulator (SOI) wafer with a layer thickness of 100 µm/1 µm/675 µm (device layer/insulating layer/backing layer) was used as the sample. 1000 Å of Pd was sputter deposited on top of the device layer followed by a hard mask layer of 2000 Å silicon dioxide. This wafer was then spin coated with 5 µm of resist and patterned with a mask to obtain a comb shaped structure with two interdigitated combs isolated from each other as shown in FIG. 3. The two interdigitated combs also have a landing pad on each side that will may be isolated and serve as the contact pad for processing and for the final battery. The photoresist was then used as a photomask to remove the silicon dioxide and palladium by ion milling.

The combination of silicon dioxide, photoresist, and Pd was used as a mask for silicon removal using Deep Reactive Ion Etching (DRIE) in a fluoride plasma. The DRIE was performed until the silicon constituting the device layer in the mask gaps was completely removed, stopping on the oxide layer. The overetch time used was 10% of the total DRIE time in order to remove islands of silicon in the trench floor. Any top photoresist was removed by stripping in acetone. At this point, the two combs had been electrically isolated by the DRIE.

A second photoresist was applied on the majority of the wafer, and exposed with a second mask to expose a small area opening on each of the comb patterns. This was subsequently used to remove the silicon dioxide by ion mill and expose the Pd layer.

The comb structure that was to serve as the anode was immersed in a solution containing $HF/H_2O$ in DMSO (2M/2.5M) and an anodic potential was applied with respect to a Pt counter electrode. The silicon comb to be anodically oxidized to form porous silicon was connected through the Pd in the open via. Current density was kept at 3 mA/cm2, and the anodization process was carried out for 60 minutes to yield a pore depth of ~20 µm. The resulting porous silicon layer had a void volume fraction of approximately 0.4. This process restricted the porous silicon formation to only one of the two comb structures.

Example 5

A silicon on insulator (SOI) wafer with a layer thickness of 100 µm/1 µm/675 µm (device layer/insulating layer/backing layer) was used as the sample. 1000 Å of Pd was sputter deposited on top of the device layer followed by a hard mask layer of 2000 Å silicon dioxide. This wafer was then spin coated with 5 µm of resist and patterned with a mask to obtain a comb shaped structure with two interdigitated combs isolated from each other. The two interdigitated combs also have a landing pad on each side that may be isolated and serve as the contact pad for processing and for the final battery. The photoresist was then used as a photomask to remove the silicon dioxide and palladium by ion milling.

The combination of silicon dioxide, photoresist, and Pd was used as a mask for silicon removal using Deep Reactive Ion Etching (DRIE) in a fluoride plasma. The DRIE was performed until the silicon constituting the device layer in the mask gaps was completely removed, stopping on the oxide layer. The overetch time used was 10% of the total DRIE time in order to remove islands of silicon in the trench floor. Any top photoresist was removed by stripping in acetone. At this point, the two combs had been electrically isolated by the DRIE.

At this point, the sample was thermally oxidized to form a 0.25 µm layer of $SiO_2$ on top of all the exposed silicon surfaces. This $SiO_2$ was deposited to serve as the mask for the electrochemical etching of silicon. Subsequently, a 50 Å layer of Au was deposited on top of the oxide layer using sputter deposition technique. The thickness of this layer of Au was optimized in order to obtain Au in the form of islands and not a full film. This Au in the form of islands was then used as a masking layer for etching the thermal oxide layer under it.

A second photoresist was applied on the majority of the wafer, and exposed with a second mask to expose the landing pad area on each of the comb patterns. This was subsequently used to remove the Au and $SiO_2$ layers by wet chemical etching. The Au was removed using a commercial KI/I2 solution, and the $SiO_2$ layer was removed using a Buffered Oxide Etch solution in order to expose the Pd top layer for a subsequent electrical contact.

The sample was then immersed in acetone to strip off the photoresist, and subsequently immersed in 1:25 BOE:water solution. The BOE solution attacks the $SiO_2$ layer in the sidewalls of the combs underneath the Au particle and transfers the pattern of the Au into the oxide. The etch was stopped after 90 seconds, this being enough to etch the oxide and expose the Si, while not undercutting the oxide layer under the Au. After rinsing and drying, the sample was ready for electrochemical dissolution.

The contact pad that had been exposed in the prior step is used to make the electrical connection for the sample during the silicon anodic etch process. This was connected as a working electrode, using a Pt counter electrode, and was electrochemically driven to dissolve the silicon from the exposed area of the connected comb structure. The sample was dipped in a solution containing 1 part ethanol, 1 part 49% HF, and 10 parts water by volume; and was driven as an anode at a current density of 15 $mA/cm^2$. The exposed silicon was dissolved leaving a microstructured silicon layer that replicated the Au nanocluster distribution comprising fibers and voids and having a void volume fraction of approximately 0.5.

Example 6

A silicon on insulator (SOI) wafer with a layer thickness of 100 µm/1 µm/675 µm (device layer/insulating layer/backing layer) was used as the sample. 1000 Å of Pd was sputter deposited on top of the device layer followed by a hard mask layer of 2000 Å silicon dioxide.

This wafer was then spin coated with 5 µm of resist and patterned with a mask to obtain a comb shaped structure with two interdigitated combs isolated from each other as shown in FIG. 3. The design shows a structure that results in two independent comb shape structures with each structure terminating in a landing pad suitable for making electrical contact. The photoresist in this pattern was then used as a photomask to remove the silicon dioxide and palladium by ion milling.

The combination of silicon dioxide, photoresist, and Pd was used as a mask for silicon removal using Deep Reactive Ion Etching (DRIE) in a fluoride plasma. The DRIE was performed until the silicon constituting the device layer in the mask gaps was completely removed, stopping on the oxide layer. The overetch time used was 10% of the total DRIE time in order to remove islands of silicon in the trench floor. Any top photoresist was removed by stripping in acetone. At this point, the two combs are electrically isolated by the DRIE.

The top masking oxide layer was subsequently removed by dipping the sample for 1 minute in dilute (5:1) Buffered Oxide Etch (BOE) solution. The dissolution time was tailored so that the insulating oxide layer in the bottom of the trench was not completely etched off.

One of the isolated pair of comb like structures was electrically connected through the palladium conductor and immersed in an electrophoretic resist bath. A commercially available electrophoretic resist was used (Shipley EAGLE), and the comb was electrophoretically deposited at 50 V for 120 seconds to form a resist coating. The die was baked at 120 C for 30 min to harden the resist.

The silicon sample was then inserted into an evaporation chamber, and 20 Å Au is deposited on the sample surface. This Au deposition process resulted in Au on the top of the honeycomb structures as well as on its sidewalls, as well as on the bottom oxide layer. However, the photoresist being present on one of the combs causes the Au to be in contact with the silicon on only one of the two comb structures. The silicon backing layer was protected at this time by an adhesive tape mask. The sample was subsequently immersed in acetone for 15 min to remove the electrophoretic resist along with the evaporated Au on top of the electrophoretic resist. This isolated the Au nanoclusters to one of the two isolated combs.

Silicon nanowires were then grown on top of one of the comb structures by CVD method. The sample was inserted into a CVD chamber and heated to 550 C. Silane gas was introduced into the chamber and the reactor pressure was kept at 10 Torr. The silicon nanowires grew on the surface that had the Au deposited on it. The deposition rate was 4 µm/hr; and the deposition was done to a target nanowire thickness of 20 µm. The resulting silicon nanowire layer had a void volume fraction of approximately 0.5 and served as the anode for the lithium-ion battery.

The comb without the silicon nanowires attached to it was electrophoretically deposited with a lithium ion battery cathode material. The Electrophoretic deposition solution contained the cathode material ($LiCoO_2$), 15 wt % carbon black, and 150 ppm of iodine in a solution of acetone. The solution mixture was stirred overnight in order to disperse the particles uniformly. The Pd contact pad was used as the terminal for electrical connection for the cathode deposition. A Pt counter electrode was used. The sample was deposited for 3 min at a voltage of 100V to deposit a 40 µm thick cathode structure.

The sample was then sent to a spin coater where the macroporous separator was applied onto the battery. The macroporous separator in this case was a combination of fine glass powder (<2 µm diameter) dispersed in acetone along with a PVDF binder of 2 volume percent. This slurry was coated on to the die and the excess slurry is spun off to fill and planarize the separator layer. The drying process resulted in the solvent evaporating and forming a macroporous separator layer.

The contact pads were then used to wirebond Au wires to serve as connection points for the battery. The whole assembly was inserted into a conventional battery pouch, filled with a conventional lithium battery electrolyte containing a lithium salt, and a mixture of organic carbonates (Propylene Carbonate+Ethylene Carbonate). The pouch was then sealed using a vacuum sealer with the wires extending out of the pouch in order to make the electrical connection.

Example 7

The process of Example 6 was repeated, except that five dies were stacked on top of each other, and each of the lines from the connection pads from each die was connected to a tab for each electrode.

The whole assembly was inserted into a conventional battery pouch, filled with a conventional lithium battery electrolyte containing a lithium salt, and a mixture of organic carbonates (Propylene Carbonate+Ethylene Carbonate). The pouch was then sealed using a vacuum sealer with the wires extending out of the pouch in order to make the electrical connection.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above articles, compositions and methods without departing from the scope of the invention, it is intended that all matter contained in the above description and shown in the accompanying drawings shall be interpreted as illustrative and not in a limiting sense.

What is claimed is:

1. A secondary battery comprising carrier ions, a non-aqueous electrolyte and at least two electrochemical stacks in a stacked arrangement, the direction of stacking of the at least two electrochemical stacks relative to each other being in a direction that is orthogonal to a reference plane, the carrier ions being lithium, sodium or potassium ions, each of the electrochemical stacks comprising, in a stacked arrangement, cathode structures, current collectors, cathodically active material layers, separator layers, anode current collectors, and a population of microstructured anodically active material layers, the separator layers being disposed between the cathodically active material layers and the members of the population of anodically active material layers, the anode current collectors having an electrical conductance that is substantially greater than the electrical conductance of the microstructured anodically active material layers, the direction of stacking of the cathode current collectors, cathodically active material layers, separator layers, anode current collectors, and microstructured anodically active material layers within each of the at least two electrochemical stacks being parallel to the reference plane, the carrier ions having a direction of travel between the cathodically active material layers and the anodically active materials of each of the at least two electrochemical stacks that is generally parallel to the reference plane as the secondary battery is charged and discharged, the members of the population of microstructured anodically active material layers of each of the at least two electrochemical stacks having a height, $H_A$, of at least 100 micrometers measured in a direction orthogonal to the reference plane, a front surface, a back surface, a thickness, T, measured from the front surface to the back surface, and a void volume fraction of at least 0.1, wherein the front and back surfaces are substantially perpendicular to the reference plane, the thickness, T, is at least 1 micrometer and measured in a direction parallel to the reference plane, and the microstructured anodically active material layers comprise a fibrous or a porous anodically active material, and wherein the lineal distance, $D_L$, between at least two members of the population of microstructured anodically active material layers of each of the at least two electrochemical stacks, measured in a direction parallel to the reference plane, is greater than the maximum value of $H_A$ for the population within each such electrochemical stack.

2. The secondary battery of claim 1 wherein the carrier ions are lithium ions.

3. The secondary battery of claim 1 wherein the population comprises at least 20 members.

4. The secondary battery of claim 1 wherein each member of the population comprises nanowires of silicon or an alloy thereof, or porous silicon or an alloy thereof.

5. The secondary battery of claim 1 wherein each member of the population comprises silicon or an alloy thereof and has a thickness of about 1 to about 100 micrometers.

6. The secondary battery of claim 1 wherein for each member of the population $H_A$ is greater than T.

7. The secondary battery of claim 1 wherein each member of the population comprises porous silicon or an alloy thereof, has a void volume fraction of at least 0.1 but less than 0.8, and a thickness of about 1 to about 200 micrometers.

8. The secondary battery of claim 1 wherein each member of the population comprises nanowires of silicon or an alloy thereof, or porous silicon or an alloy thereof, has a void volume fraction of at least 0.1 but less than 0.8, a thickness of about 1 to about 200 micrometers, and is supported by a backbone and the maximum value of $H_A$ for the population is less than 5,000 micrometers.

9. The secondary battery of claim 1 wherein each member of the population comprises nanowires of silicon or an alloy thereof, or porous silicon or an alloy thereof, has a void volume fraction of at least 0.1 but less than 0.8, a thickness of about 1 to about 200 micrometers, and is supported by a backbone having an electrical conductivity of less than 10 Siemens/cm, and the maximum value of $H_A$ for the population is less than 1,000 micrometers.

10. The secondary battery of claim 1 wherein the anode structures comprise an anode current collector, the cathode structures comprise a cathode current collector, and the anode current collector or the cathode current collector comprises an ionically permeable conductor layer.

11. The secondary battery of claim 1 wherein the anode structures comprise an anode current collector layer and the anode current collector layer is disposed between the anodically active material layer and a separator layer.

12. The secondary battery of claim 1 wherein each member of the population comprises nanowires of silicon or an alloy thereof, or porous silicon or an alloy thereof, has a void volume fraction of at least 0.1 but less than 0.8, a thickness of about 1 to about 200 micrometers, and is supported by a backbone and the maximum value of $H_A$ for the population is less than 5,000 micrometers.

13. The secondary battery of claim 1 wherein a ratio of the electrical conductance of the anode current collector to the electrical conductance of the microstructured anodically active material layer is at least 100:1.

14. The secondary battery of claim 1 wherein a ratio of the electrical conductance of the anode current collector to the electrical conductance of the microstructured anodically active material layer is at least 500:1.

15. The secondary battery of claim 1 wherein the anode current collector comprises a porous layer of a metal or a metal alloy that does not form an intermetallic compound with lithium.

16. The secondary battery of claim 1 wherein the anode current collector comprises porous copper silicide or porous nickel silicide.

17. The secondary battery of claim 1 wherein the cathode current collectors, cathodically active material layers, separator layers, anode current collectors, and microstructured anodically active material layers are stacked in this order.

18. The secondary battery of claim 1 wherein the cathodically active material layers, cathode current collectors, separator layers, microstructured anodically active material layers and anode current collectors are stacked in this order.

19. The secondary battery of claim 1 wherein the lineal distance, $D_L$, between at least two members of the population of microstructured anodically active material layers of each of the at least two electrochemical stacks, measured in a direction parallel to the reference plane, is greater than the maximum value of $H_A$ for the population within each such electrochemical stack, respectively, by a factor of at least 10.

20. The secondary battery of claim 1 wherein each of the electrochemical stacks additionally comprises anode backbones and the anode backbones comprise an anode current collector having an electrical conductivity of at least about $10^4$ Siemens/cm.

* * * * *